US012684591B2

(12) United States Patent
Matsumura et al.

(10) Patent No.: US 12,684,591 B2
(45) Date of Patent: Jul. 14, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 296 days.

(21) Appl. No.: 18/690,021

(22) PCT Filed: Sep. 10, 2021

(86) PCT No.: PCT/JP2021/033417
§ 371 (c)(1),
(2) Date: Mar. 7, 2024

(87) PCT Pub. No.: WO2023/037518
PCT Pub. Date: Mar. 16, 2023

(65) Prior Publication Data
US 2024/0292431 A1    Aug. 29, 2024

(51) Int. Cl.
H04W 72/232        (2023.01)
H04W 72/1268       (2023.01)

(52) U.S. Cl.
CPC ..... H04W 72/232 (2023.01); H04W 72/1268 (2013.01)

(58) Field of Classification Search
CPC ........... H04W 72/232; H04W 72/1268; H04W 72/23; H04L 1/1848; H04L 1/1887; H04L 1/189; H04L 5/0044; H04L 5/0094
See application file for complete search history.

(56) References Cited

U.S. PATENT DOCUMENTS

2021/0266912 A1* 8/2021 Ma ........................ H04W 72/21

OTHER PUBLICATIONS

International Search Report issued in PCT/JP2021/033417 on Apr. 12, 2022 (3 pages).
Written Opinion of the International Searching Authority issued in PCT/JP2021/033417 on Apr. 12, 2022 (3 pages).
(Continued)

*Primary Examiner* — Christopher M Brandt
(74) *Attorney, Agent, or Firm* — Osha Bergman Watanabe & Burton LLP

(57) ABSTRACT

A terminal according to one aspect of the present disclosure includes: a receiving section that receives first downlink control information indicating cancellation of UL transmission; and a control section that judges whether uplink shared channel transmission is scheduled, based on a symbol position of a first control channel providing the first downlink control information and a symbol position of a second downlink control channel providing second downlink control information for scheduling the uplink shared channel transmission, wherein the control section judges the symbol position of the first downlink control channel and the symbol position of the second downlink control channel, based on at least one of whether repetition transmission of the first downlink control channel is performed and whether repetition transmission of the second downlink control channel is performed.

10 Claims, 27 Drawing Sheets

(56)     References Cited

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

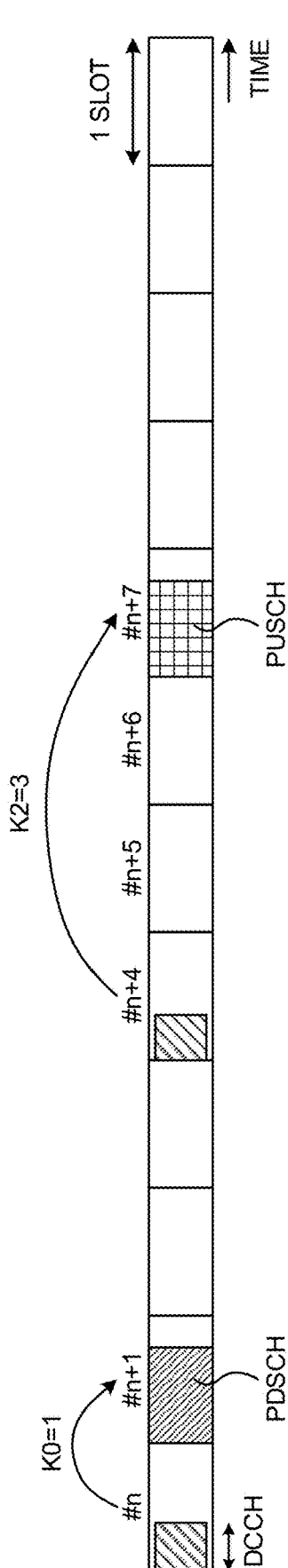
FIG. 1

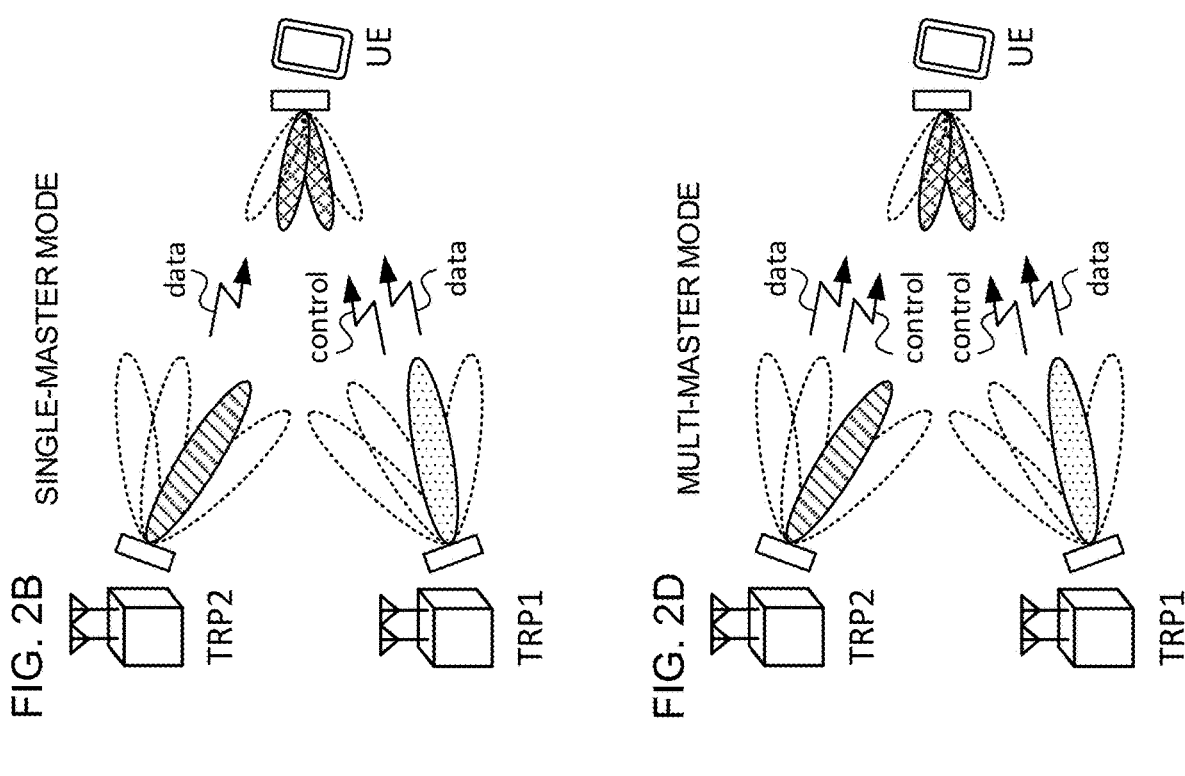
FIG. 2A    SINGLE MODE
FIG. 2B    SINGLE-MASTER MODE
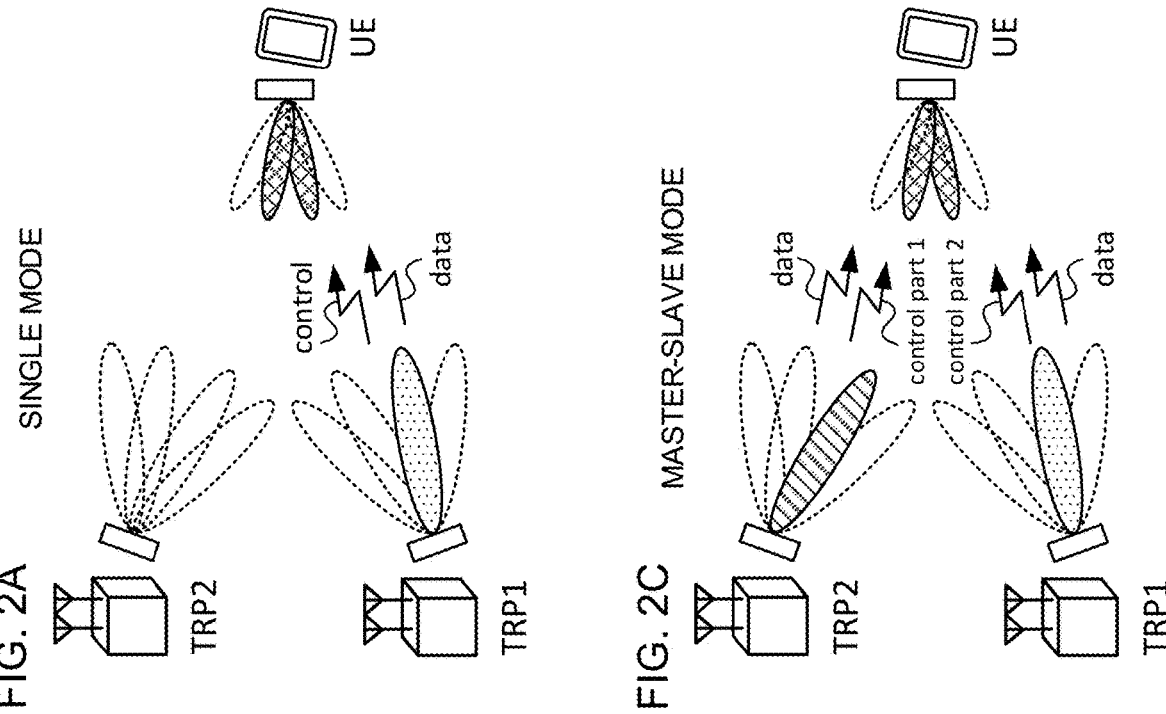
FIG. 2C    MASTER-SLAVE MODE
FIG. 2D    MULTI-MASTER MODE

```
searchSpaceType
    common                          CHOICE {
                                    SEQUENCE { dci-Format2-0               SEQUENCE {
            nrofCandidates-SFI          SEQUENCE {
                aggregationLevel1           ENUMERATED {n1, n2}         OPTIONAL,   -- Need R
                aggregationLevel2           ENUMERATED {n1, n2}         OPTIONAL,   -- Need R
                aggregationLevel4           ENUMERATED {n1, n2}         OPTIONAL,   -- Need R
                aggregationLevel8           ENUMERATED {n1, n2}         OPTIONAL,   -- Need R
                aggregationLevel16          ENUMERATED {n1, n2}         OPTIONAL,   -- Need R
            },
        ...

SearchSpaceExt-r16 ::=              SEQUENCE {
...

common-r16                      SEQUENCE {
        dci-Format2-4-r16               SEQUENCE {
            nrofCandidates-CI-r16           SEQUENCE {
                aggregationLevel1-r16           ENUMERATED {n1, n2}     OPTIONAL,   -- Need R
                aggregationLevel2-r16           ENUMERATED {n1, n2}     OPTIONAL,   -- Need R
                aggregationLevel4-r16           ENUMERATED {n1, n2}     OPTIONAL,   -- Need R
                aggregationLevel8-r16           ENUMERATED {n1, n2}     OPTIONAL,   -- Need R
                aggregationLevel16-r16          ENUMERATED {n1, n2}     OPTIONAL    -- Need R
            },
        ...

dci-Format2-5-r16               SEQUENCE {
            nrofCandidates-IAB-r16          SEQUENCE {
                aggregationLevel1-r16           ENUMERATED {n1, n2}     OPTIONAL,   -- Need R
                aggregationLevel2-r16           ENUMERATED {n1, n2}     OPTIONAL,   -- Need R
                aggregationLevel4-r16           ENUMERATED {n1, n2}     OPTIONAL,   -- Need R
                aggregationLevel8-r16           ENUMERATED {n1, n2}     OPTIONAL,   -- Need R
                aggregationLevel16-r16          ENUMERATED {n1, n2}     OPTIONAL    -- Need R
            },
```

Table 13-1: Set of resource blocks and slot symbols of CORESET for Type0-PDCCH search space set when {SS/PBCH block, PDCCH} SCS is {15, 15} kHz for frequency bands with minimum channel bandwidth 5 MHz or 10 MHz

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | Reserved | | | |

FIG. 19B

Table 13-11: Parameters for PDCCH monitoring occasions for Type0-PDCCH CSS set - SS/PBCH block and CORESET multiplexing pattern 1 and FR1

| Index | O | Number of search space sets per slot | M | First symbol index |
|---|---|---|---|---|
| 0 | 0 | 1 | 0 | 0 |
| 1 | 0 | 2 | 1/2 | {0, if $i$ is even}, {$N_{symb}^{CORESET}$, if $i$ is odd} |
| 2 | 2 | 1 | 1 | 0 |
| 3 | 2 | 2 | 1/2 | {0, if $i$ is even}, {$N_{symb}^{CORESET}$, if $i$ is odd} |
| 4 | 5 | 1 | 1 | 0 |
| 5 | 5 | 2 | 1/2 | {0, if $i$ is even}, {$N_{symb}^{CORESET}$, if $i$ is odd} |
| 6 | 7 | 1 | 1 | 0 |
| 7 | 7 | 2 | 1/2 | {0, if $i$ is even}, {$N_{symb}^{CORESET}$, if $i$ is odd} |
| 8 | 0 | 1 | 1 | 0 |
| 9 | 5 | 1 | 1 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

FIG. 20A

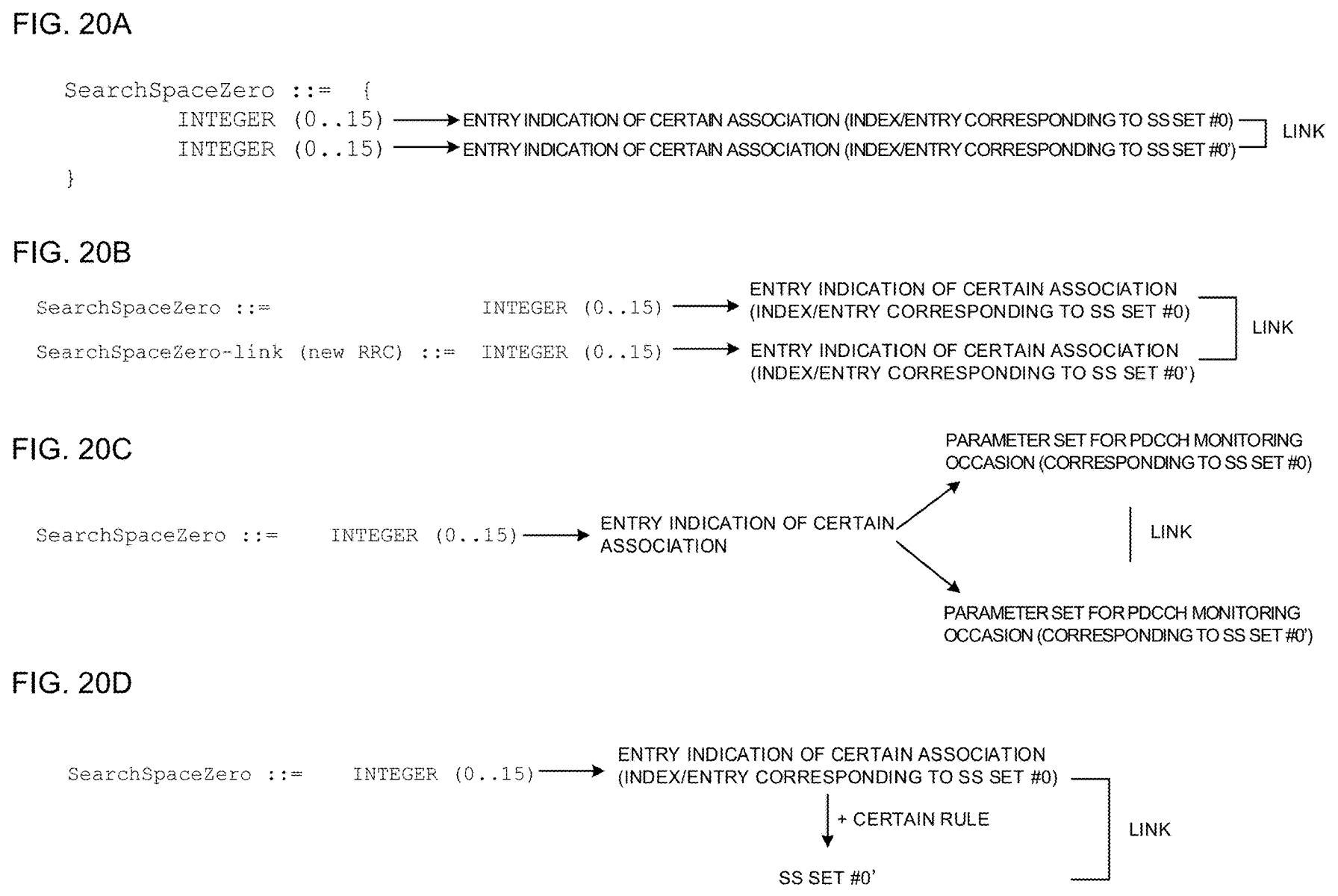

```
SearchSpaceZero ::= {
    INTEGER (0..15) ──→ ENTRY INDICATION OF CERTAIN ASSOCIATION (INDEX/ENTRY CORRESPONDING TO SS SET #0)
    INTEGER (0..15) ──→ ENTRY INDICATION OF CERTAIN ASSOCIATION (INDEX/ENTRY CORRESPONDING TO SS SET #0')
}
```
LINK

FIG. 20B

```
SearchSpaceZero ::= INTEGER (0..15) ──→ ENTRY INDICATION OF CERTAIN ASSOCIATION
                                        (INDEX/ENTRY CORRESPONDING TO SS SET #0)

SearchSpaceZero-link (new RRC) ::= INTEGER (0..15) ──→ ENTRY INDICATION OF CERTAIN ASSOCIATION
                                                       (INDEX/ENTRY CORRESPONDING TO SS SET #0')
```
LINK

FIG. 20C

```
SearchSpaceZero ::= INTEGER (0..15) ──→ ENTRY INDICATION OF CERTAIN
                                        ASSOCIATION
```
PARAMETER SET FOR PDCCH MONITORING OCCASION (CORRESPONDING TO SS SET #0)

LINK

PARAMETER SET FOR PDCCH MONITORING OCCASION (CORRESPONDING TO SS SET #0')

FIG. 20D

```
SearchSpaceZero ::= INTEGER (0..15) ──→ ENTRY INDICATION OF CERTAIN ASSOCIATION
                                        (INDEX/ENTRY CORRESPONDING TO SS SET #0)
                                        + CERTAIN RULE ──→ SS SET #0'
```
LINK

FIG. 21A

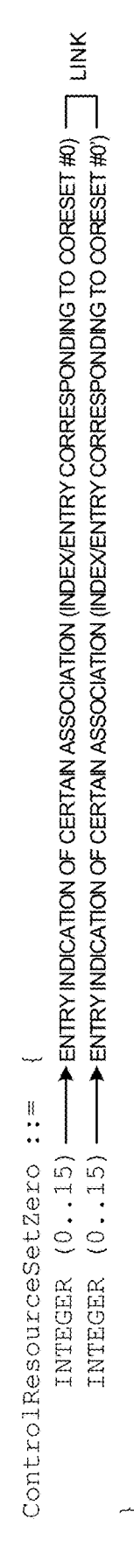

```
ControlResourceSetZero ::=    {
    INTEGER (0..15) ──────► ENTRY INDICATION OF CERTAIN ASSOCIATION (INDEX/ENTRY CORRESPONDING TO CORESET #0)
    INTEGER (0..15) ──────► ENTRY INDICATION OF CERTAIN ASSOCIATION (INDEX/ENTRY CORRESPONDING TO CORESET #0')
}
```

LINK

FIG. 21B

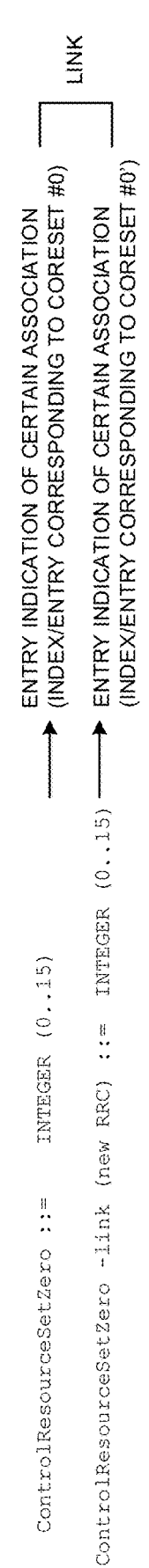

```
ControlResourceSetZero ::=    INTEGER (0..15)

ControlResourceSetZero -link (new RRC) ::=    INTEGER (0..15)
```

ENTRY INDICATION OF CERTAIN ASSOCIATION
(INDEX/ENTRY CORRESPONDING TO CORESET #0)

ENTRY INDICATION OF CERTAIN ASSOCIATION
(INDEX/ENTRY CORRESPONDING TO CORESET #0')

LINK

FIG. 21C

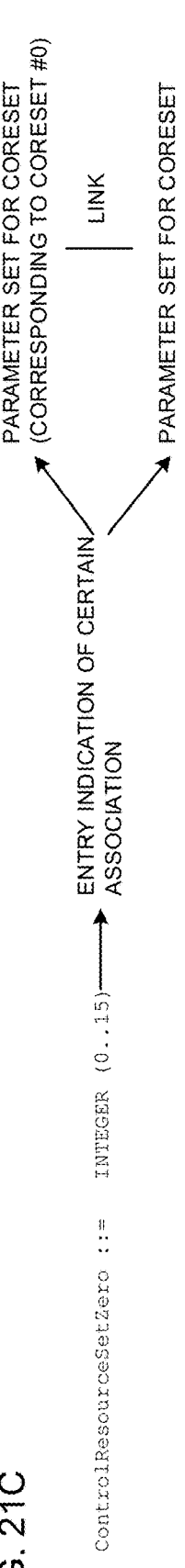

```
ControlResourceSetZero ::=    INTEGER (0..15) ──────►
```

ENTRY INDICATION OF CERTAIN
ASSOCIATION

PARAMETER SET FOR CORESET
(CORRESPONDING TO CORESET #0)

PARAMETER SET FOR CORESET
(CORRESPONDING TO CORESET #0')

LINK

FIG. 21D

```
ControlResourceSetZero ::=    INTEGER (0..15) ──────►
```

ENTRY INDICATION OF CERTAIN ASSOCIATION
(INDEX/ENTRY CORRESPONDING TO CORESET #0)

+ CERTAIN RULE ──────►

CORESET#0'

LINK

```
searchSpaceSIB1
    SearchSpaceId              OPTIONAL,    -- Need S
    SearchSpaceId              OPTIONAL,    -- Need S
}
searchSpaceOtherSystemInformation
    SearchSpaceId              OPTIONAL,    -- Need S
    SearchSpaceId              OPTIONAL,    -- Need S
}
pagingSearchSpace
    SearchSpaceId              OPTIONAL,    -- Need S
    SearchSpaceId              OPTIONAL,    -- Need S
}
ra-SearchSpace
    SearchSpaceId              OPTIONAL,    -- Need S
    SearchSpaceId              OPTIONAL,    -- Need S
}
```

FIG. 22

BASE STATION 10, USER TERMINAL 20

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+(plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010.

SUMMARY OF INVENTION

Technical Problem

For future radio communication systems (for example, NR), it is studied that one or a plurality of transmission/reception points (TRPs) (multi-TRP) perform DL transmission (for example, PDSCH transmission) to a terminal (user terminal, User Equipment (UE)) by using one or a plurality of panels (multi-panel).

In NR, it is assumed to apply repetition transmission to certain channels (for example, PDCCHs). For example, it is conceivable to control scheduling of DL transmission/UL transmission by using a plurality of PDCCHs to which repetition transmission is applied by multi-panel/TRP.

However, in previous NR specifications, how to control repetition transmission from one or more TRPs has not been sufficiently studied.

Thus, an object of the present disclosure is to provide a terminal, a radio communication method, and a base station that enable appropriate communication even when repetition transmission is applied to DL channels transmitted from one or more TRPs.

Solution to Problem

A terminal according to one aspect of the present disclosure includes: a receiving section that receives first downlink control information indicating cancellation of UL transmission; and a control section that judges whether uplink shared channel transmission is scheduled, based on a symbol position of a first control channel providing the first downlink control information and a symbol position of a second downlink control channel providing second downlink control information for scheduling the uplink shared channel transmission, wherein the control section judges the symbol position of the first downlink control channel and the symbol position of the second downlink control channel, based on at least one of whether repetition transmission of the first downlink control channel is performed and whether repetition transmission of the second downlink control channel is performed.

Advantageous Effects of Invention

According to one aspect of the present disclosure, it is possible to appropriately perform communication even when repetition transmission is applied to DL channels transmitted from one or more TRPs.

BRIEF DESCRIPTION OF DRAWINGS

FIG. 1 is a diagram to show an example of control of scheduling of physical shared channels based on PDCCHs/DCI.

FIG. 2A to FIG. 2D are diagrams to show examples of a multi-TRP scenario.

FIG. 6 is a diagram to show an example of a higher layer parameter related to search space.

FIG. 19A and FIG. 19B are diagrams to show examples of associations between a value notified by a higher layer parameter and a specific parameter.

FIG. 20A to FIG. 20D are diagrams to show examples of a configuration in PDCCH repetition in a fifth aspect.

FIG. 21A to FIG. 21D are diagrams to show other examples of the configuration in PDCCH repetition in the fifth aspect.

FIG. 22 is a diagram to show another example of the configuration in PDCCH repetition in the fifth aspect.

DESCRIPTION OF EMBODIMENTS

<Allocation of Time Domain Resource>

Figure 3:
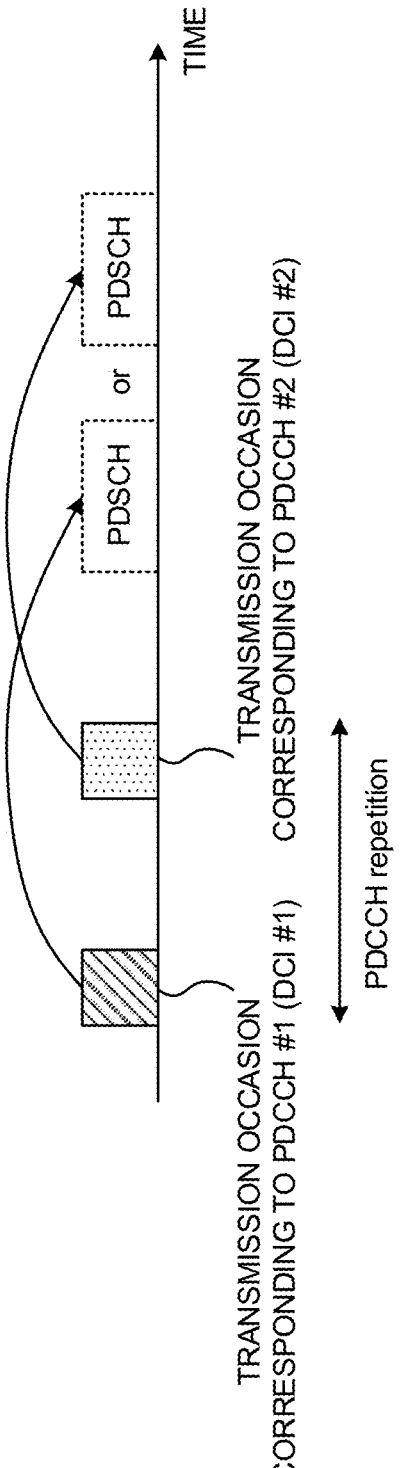
FIG. 3 is a diagram to show an example of PDCCH repetition transmission.

In existing systems (for example, Rel. 15), time domain resource allocation information for a physical shared channel (at least one of a PDSCH and a PUSCH) is included in downlink control information (DCI). A network (for example, a base station) uses a certain field (for example, a TDRA field) included in the DCI to notify a UE of information related to a time domain resource in which a physical shared channel scheduled by the DCI is scheduled.

The information related to the time domain resource may include at least one of information indicating an offset between the DCI and the physical shared channel (for example, a slot offset K0), information indicating a start symbol (for example, a start symbol S), and information indicating the length of the physical shared channel (for example, a length L), for example.

Pieces of bit information (or, codepoints) notified by the TDRA field may be associated with different time domain resource allocation candidates (or entries). For example, a table (for example, a TDRA table) in which the pieces of bit information and the time domain resource allocation candidates (K0, S, L) are associated with each other may be defined. The time domain resource allocation candidates may be predefined in a specification or may be notified the UE/configured for the UE by higher layer signaling.

{PDSCH}

The UE may determine a row index (or an entry number or an entry index) in a certain table, based on the value in a TDRA field in DCI (for example, DCI format 1_0/1_1/1_2). The certain table may include at least one of information indicating a time offset (for example, the slot offset K0) between DCI and a PDSCH scheduled by the DCI, information indicating the mapping type of the PDSCH, and the start symbol S and the time length L of a PDSCH. The combination of the start symbol S and the time length L of a PDSCH may be referred to as a Start and Length Indicator (SLIV).

The UE may determine a time domain resource in which the PDSCH is scheduled, based on at least one of the value of a certain field included in the DCI, the slot offset K0 information defined in the table, the mapping type, the start symbol S, the symbol length L, and the SLIV (refer to FIG. 1). Note that a reference point for the start symbol S and the symbol length L may be controlled based on the start position (first symbol) of the slot. The start symbol S, the symbol length L, and the like may be defined according to the mapping type of the PDSCH.

As shown in FIG. 1, the UE judges (determines) the slot in which the PDSCH is scheduled with the DCI (or the PDCCH used for transmission of the DCI) as a reference point in the time domain. For example, when the UE receives the DCI for scheduling the PDSCH in slot #n, the UE may determine a slot in which the UE receives the PDSCH (allocated to the PDSCH), based on at least one of a number n of the slot, subcarrier spacing $\mu_{PDSCH}$ for PDSCH, subcarrier spacing $\mu_{PDCCH}$ for PDCCH, and the time offset K0. Here, a case where the slot offset K0=1 and the PDSCH and the PDCCH have the same subcarrier spacing is shown.

For the resource allocation information (for example, SLIV) specified by the TDRA field, the UE determines allocation of the PDSCH with the start point of the slot to which the PDSCH is allocated as a reference. Note that the reference point may be referred to as a point of reference.

{PUSCH}

The UE may determine a row index (or an entry number or an entry index) in a certain table, based on the value in the TDRA field in the DCI (for example, DCI format 0_0/0_1/0_2). The certain table may include at least one of information indicating a time offset (for example, the slot offset K2) between DCI and a PUSCH scheduled by the DCI, information indicating the mapping type of the PUSCH, and the start symbol S and the time length L of the PUSCH. The combination of the start symbol S and the time length L of the PUSCH may be referred to as a Start and Length Indicator (SLIV).

The UE may determine a time domain resource in which the PUSCH is scheduled, based on at least one of the value of a certain field included in the DCI, the slot offset K2 information defined in the table, the mapping type, the start symbol S, the symbol length L, and the SLIV (refer to FIG. 1). Note that a reference point for the start symbol S and the symbol length L may be controlled based on the start position (first symbol) of the slot. The start symbol S, the symbol length L, and the like may be defined according to the mapping type of the PDSCH.

As shown in FIG. 1, the UE judges the slot in which the PUSCH is scheduled with the DCI (or the PDCCH used for transmission of the DCI) as a reference point in the time domain. For example, when the UE receives the DCI for scheduling the PUSCH in slot #n+4, the UE may determine a slot in which the UE transmits the PUSCH (allocated to the PUSCH), based on at least one of a number n+4 of the slot, subcarrier spacing $\mu_{PDSCH}$ for PUSCH, subcarrier spacing $\mu_{PDCCH}$ for PUCCH, and the time offset K2. Here, a case where the slot offset K2=3 and the PDSCH and the PDCCH have the same subcarrier spacing is shown.

For the resource allocation information (for example, SLIV) specified by the TDRA field, the UE determines allocation of the PUSCH with the start point of the slot to which the PUSCH is allocated as a reference.

(Multi-TRP)

For NR, it is studied that one or a plurality of transmission/reception points (TRPs) (multi-TRP) perform DL transmission to a UE by using one or a plurality of panels (multi-panel). It is also studied that the UE performs UL transmission to the one or plurality of TRPs.

Note that the plurality of TRPs may correspond to the same cell identifier (ID) or may correspond to different cell IDs. The cell ID may be a physical cell ID or a virtual cell ID.

FIG. 2A to FIG. 2D are diagrams to show examples of a multi-TRP scenario. In these examples, it is assumed that each TRP can transmit four different beams, but this is not restrictive.

FIG. 2A shows an example of a case where only one TRP (TRP1 in this example) of multi-TRP performs transmission to a UE (which may be referred to as a single mode, a single TRP, and the like). In this case, TRP1 transmits both a control signal (PDCCH) and a data signal (PDSCH) to the UE.

FIG. 2B shows an example of a case where only one TRP (TRP1 in this example) of the multi-TRP transmits a control signal to the UE and the multi-TRP transmits data signals (which may be referred to as a single master mode). The UE receives PDSCHs transmitted from the multi-TRP, based on one piece of downlink control information (DCI).

FIG. 2C shows an example of a case where each of the multi-TRP transmits part of a control signal to the UE and the multi-TRP transmits data signals (which may be referred to as a master-slave mode). TRP1 may transmit part 1 of the control signal (DCI), and TRP2 may transmit part 2 of the control signal (DCI). Part 2 of the control signal may depend on part 1. The UE receives the PDSCHs transmitted from the multi-TRP, based on these parts of DCI.

FIG. 2D shows an example of a case where each of the multi-TRP transmits a separate control signal to the UE and the multi-TRP transmits data signals (which may be referred to as a multi-master mode). TRP1 may transmit a first control signal (DCI), and TRP2 may transmit a second control signal (DCI). The UE receives the PDSCHs transmitted from the multi-TRP, based on these pieces of DCI.

When a plurality of PDSCHs from multi-TRP (which may be referred to as multi-PDSCH (multiple PDSCHs)) are scheduled by using one piece of DCI as in FIG. 2B, the DCI may be referred to as single DCI (S-DCI, single PDCCH). When a plurality of PDSCHs from multi-TRP are scheduled by using a plurality of DCI as in FIG. 2D, the plurality of DCI may be referred to as multi-DCI (M-DCI, multi-PDCCH (multiple PDCCHs)).

Each TRP of the multi-TRP may transmit a different codeword (Code Word (CW)) and a different layer. As one mode of multi-TRP transmission, non-coherent joint transmission (NCJT) is studied.

In NCJT, for example, TRP1 performs modulation mapping on a first codeword, performs layer mapping, and transmits a first PDSCH in layers of a first number (for example, two layers) by using first precoding. TRP2 performs modulation mapping on a second codeword, performs layer mapping, and transmits a second PDSCH in layers of a second number (for example, two layers) by using second precoding.

Note that a plurality of PDSCHs (multi-PDSCH) transmitted by NCJT may be defined to partially or entirely overlap in terms of at least one of the time and frequency domains. In other words, the first PDSCH from a first TRP and the second PDSCH from a second TRP may overlap in terms of at least one of the time and frequency resources.

The first PDSCH and the second PDSCH may be assumed not to be in a quasi-co-location (QCL) relationship (not to be quasi-co-located). Reception of the multi-PDSCH may be interpreted as simultaneous reception of PDSCHs of a QCL type other than a certain QCL type (for example, QCL type D).

For URLLC for multi-TRP, it is studied to support PDSCH (transport block (TB) or codeword (CW)) repetition over multi-TRP. It is studied to support a scheme of repetition over multi-TRP in the frequency domain, the layer (space) domain, or the time domain (URLLC schemes, for example, schemes 1, 2a, 2b, 3, and 4). In scheme 1, multi-PDSCH from multi-TRP is space division multiplexed (SDMed). In schemes 2a and 2b, PDSCHs from multi-TRP are frequency division multiplexed (FDMed). In scheme 2a, a redundancy version (RV) is the same for the multi-TRP. In scheme 2b, an RV may be the same or may be different for the multi-TRP. In schemes 3 and 4, multi-PDSCH from multi-TRP is time division multiplexed (TDMed). In scheme 3, multi-PDSCH from multi-TRP is transmitted in one slot. In scheme 4, multi-PDSCH from multi-TRP is transmitted in different slots.

According to such a multi-TRP scenario, more flexible transmission control using a channel with high quality is possible.

NCJT using multi-TRP/panel may use a high rank. To support ideal and non-ideal backhaul between a plurality of TRPs, both single DCI (single PDCCH, for example, FIG. 2B) and multi-DCI (multi-PDCCH, for example, FIG. 2D) may be supported. A maximum number of TRPs for each of both single DCI and multi-DCI may be two.

Enhancement of TCI is studied for single-PDCCH design (mainly for ideal backhaul). Each TCI codepoint in DCI may correspond to one or two TCI states. The TCI field size may be the same as that in Rel. 15.

In Rel. 17 and later versions, it is also assumed that repetition transmission (PDCCH repetition) is applied to a PDCCH(s) (or a piece(s) of DCI) transmitted from one or more TRPs. For example, it is considered to use a plurality of PDCCHs (or DCI) transmitted from one or a plurality of TRPs, to perform scheduling or transmission/reception indication for one or more signals/channels.

The PDCCHs/DCI to which repetition transmission is applied may be referred to as multi-PDCCH/multi-DCI. PDCCH repetition transmission may be interpreted as PDCCH repetition, a plurality of PDCCH transmissions, multi-PDCCH transmission, or multiple PDCCH transmissions.

Multi-PDCCH/multi-DCI may be transmitted from one TRP. Alternatively, multi-PDCCH/multi-DCI may be transmitted from respective different TRPs. The multi-PDCCH/DCI may be multiplexed by time multiplexing (TDM)/frequency multiplexing (FDM)/space multiplexing (SDM). For example, when PDCCH repetition is performed by using time multiplexing (TDM PDCCH repetition), PDCCHs transmitted from respective different TRPs are allocated to different time domains.

Assume a case where scheduling of one or more physical shared channels (for example, a DL-SCH(s)/transport block(s)) is performed by using the multi-PDCCH/DCI. The one or more physical shared channels may be, for example, the same/one physical shared channel (for example, a DL-SCH/transport block) or a plurality of physical shared channels scheduled in the same time domain. In such a case, a problem is how to control scheduling control (for example, the contents to notify by each DCI, a reference point at the time of scheduling, and the like).

For example, it is a problem, when the contents of DCI transmitted by respective PDCCHs in different time domains (for example, DCI payloads/coded bits/the numbers of CCEs) are the same, how the UE applies/interprets each PDCCH/DCI to control transmission processing or reception processing. As an example, it is a problem how the UE applies/interprets an indication of a time relationship of the PDCCHs/DCI (for example, the identical values) to control the scheduling.

FIG. 3 shows an example where scheduling of one PDSCH (for example, identical PDSCHs) is performed by PDCCHs to which repetition transmission is applied.

In this case, scheduling of a physical shared channel may be controlled based on timing related information (for example, time domain resource allocation information) included in respective PDCCHs/DCI transmitted in different time domains (for example, different slots/symbols). The PDCCHs transmitted in the different time domains may be configured to schedule identical transport blocks (or physical shared channels transporting identical transport blocks).

However, it is a problem, when scheduling is performed by using a plurality of PDCCHs/DCI, how to control configuration or interpretation in the UE of timing related information (for example, time domain resource allocation information) included in the respective PDCCHs/DCI.

For example, when the timing related information (for example, identical values/identical payloads) included in the respective PDCCHs/DCI are applied/interpreted with the respective PDCCHs/DCI as a reference, the UE may not be able to appropriately grasp the one PDSCH (for example, transmission/reception timing) scheduled by the PDCCH repetition (refer to FIG. 3).

The inventors of the present invention studied how to perform determination of a PDCCH/DCI/control resource set to be a reference or control based on the PDCCH/DCI/control resource set to be a reference in one or more cases of using PDCCH repetition (for example, a plurality of PDCCHs/DCI) to perform transmission processing/reception processing, and came up with the idea of the present embodiment.

Alternatively, it is also assumed that repetition transmission is applied to downlink control channels (or CORESETs/downlink control channel candidates/search spaces/search space sets) to be used for transmission of UE-common DCI (or DCI transmitted by using a common search space). The UE performs monitoring of a PDCCH candidate set in a CORESET, but it is a problem, when repetition transmission is applied to downlink control channels (or CORESETs/downlink control channel candidates/search spaces/search space sets), how to control the monitoring of the PDCCH candidates in the CORESET/common search space.

The inventors of the present invention focused on a case where repetition transmission is supported for a PDCCH corresponding to UE-common DCI (for example, at least one of DCI formats 2_0 to 2_6)/common search space set (for example, a Type0/0A/1/2/3-PDCCH CSS set), studied control of reception of PDCCHs in such a case, and came up with the idea of the present embodiment.

Embodiments according to the present disclosure will be described in detail with reference to the drawings as follows. Note that the aspects (for example, cases) to be described below may each be employed individually, or may be employed in combination of at least two.

In the present disclosure, "A/B" and "at least one of A and B" may be interchangeably interpreted. In the present disclosure, "A/B/C" may mean "at least one of A, B, and C."

In the present disclosure, activate, deactivate, indicate, select, configure, update, determine, and the like may be interchangeably interpreted. In the present disclosure, "support," "control," "controllable," "operate," "operable," and the like may be interchangeably interpreted.

In the present disclosure, radio resource control (RRC), an RRC parameter, an RRC message, a higher layer parameter, an information element (IE), a configuration, and the like may be interchangeably interpreted. In the present disclosure, a Medium Access Control control element (MAC Control Element (CE)), an update command, an activation/deactivation command, and the like may be interchangeably interpreted.

In the present disclosure, the higher layer signaling may be, for example, any one or combinations of Radio Resource Control (RRC) signaling, Medium Access Control (MAC) signaling, broadcast information, and the like.

In the present disclosure, the MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, the physical layer signaling may be, for example, downlink control information (DCI), uplink control information (UCI), and the like.

In the present disclosure, an index, an identifier (ID), an indicator, a resource ID, and the like may be interchangeably interpreted. In the present disclosure, a sequence, a list, a set, a group, a cluster, a subset, and the like may be interchangeably interpreted.

In the present disclosure, a panel, a UE panel, a panel group, a beam, a beam group, a precoder, an Uplink (UL) transmission entity, a transmission/reception point (TRP), a base station, spatial relation information (SRI), a spatial relation, an SRS resource indicator (SRI), a control resource set (CORESET), a Physical Downlink Shared Channel (PDSCH), a codeword (CW), a transport block (TB), a reference signal (RS), an antenna port (for example, a demodulation reference signal (DMRS) port), an antenna port group (for example, a DMRS port group), a group (for example, a spatial relation group, a code division multiplexing (CDM) group, a reference signal group, a CORESET group, a Physical Uplink Control Channel (PUCCH) group, a PUCCH resource group), a resource (for example, a reference signal resource, an SRS resource), a resource set (for example, a reference signal resource set), a CORESET pool, a downlink Transmission Configuration Indication state (TCI state) (DL TCI state), an uplink TCI state (UL TCI state), a unified TCI state, a common TCI state, quasi-colocation (QCL), QCL assumption, and the like may be interchangeably interpreted.

A spatial relation information Identifier (ID) (TCI state ID) and spatial relation information (TCI state) may be interchangeably interpreted. The "spatial relation information" may be interpreted as a "set of spatial relation information," "one or a plurality of spatial relation information," and the like, and vice versa. A TCI state and TCI may be interchangeably interpreted.

In the present disclosure, PDSCHs (or DL-SCHs/CWs/TBs)/PUSCHs (or UL-SCHs) scheduled/transmitted in PDCCHs applied with repetition transmission may have the same contents or may have different contents.

DCI in the following embodiments may be limited to a specific DCI format or may correspond to a plurality of DCI formats among DCI formats (for example, DCI formats 0_0, 0_1, and 0_2) for scheduling a PUSCH. Note that, when the DCI corresponds to a plurality of DCI formats, control common to the DCI formats (the same control, the same processing) may be performed, or different control may be performed for each DCI format.

In the following embodiments, a "plurality of" and "two" may be interchangeably interpreted.

(Radio Communication Method)

In the present disclosure, a plurality of PDCCHs/DCI (for example, multi-PDCCH/multi-DCI) applied with repetition transmission may be associated in terms of a certain transmission parameter (or between one or more certain transmission parameters), for configuration. The certain transmission parameter may be at least one of a control channel element (CCE), a PDCCH candidate, a resource element group (REG), a search space, a search space set, and a CORESET.

For example, certain transmission parameters may be associated with each other between a PDCCH to serve as a time reference (for example, the PDCCH to be transmitted first in repetition transmission) and another PDCCH, for configuration. As an example, a certain transmission parameter may be configured based on a repetition order (or in association with a transmission order) among the transmission parameters of the plurality of PDCCHs applied with repetition. The UE can judge the transmission order of the PDCCHs (for example, the PDCCH to be transmitted first), based on information related to the PDCCH repetition (for example, the number of repetitions, repetition periodicity, and the like) and the transmission parameters corresponding to the respective PDCCHs.

In the present disclosure, the PDCCHs applied with repetition transmission may be interpreted as CORESETs/PDCCH candidates/search spaces/search space sets applied with repetition transmission. In other words, repetition transmission being applied to PDCCHs may be interpreted as repetition transmission being applied to CORESETs/PDCCH candidates/search spaces/search space sets. In the present disclosure, a PDCCH, a CORESET, a PDCCH candidate, search space, and a search space set may be interchangeably interpreted.

When repetition transmission is applied to PDCCHs, CORESETs/PDCCH candidates/search space sets corresponding to respective different repetition transmissions may be associated with or linked to each other, for configuration. A plurality of (for example, two) linked PDCCH candidates or a plurality of (for example, two) linked search space sets may correspond to one CORESET or may correspond to respective different CORESETs.

When repetition transmission is performed by PDCCHs transmitted from a plurality of respective TRPs (for example, two TRPs), CORESETs/PDCCH candidates/search spaces/search space sets corresponding to the respective TRPs may be associated with each other, for configuration. A plurality of (for example, two) associated CORESETs/PDCCH candidates/search spaces/search space sets may be referred to as linked CORESETs/linked PDCCH candidates/linked search spaces/linked search space sets.

In the present embodiment, description will be given by taking, as an example, a case where DCI with the same payload content (same DCI payload content) are transmitted by PDCCH repetitions (TDM PDCCH repetitions) transmitted in different time domains. In other words, this corresponds to a case where the UE is notified of the same DCI payload content by each of multi-PDCCH. Note that the present embodiment may be applied, without being limited to this, to a case where transmission of DCI with different payload contents (same DCI payload content) is supported/permitted by PDCCH repetitions transmitted in different time domains.

The same payload content may mean a case where the values of all the fields included in the DCI are configured to be the same. Alternatively, the same payload content may mean a case where the values of part of certain fields included in the DCI are configured to be the same.

The certain fields may be a time related information notification field. The time related information may be interpreted as timing related information, time related indication, or timing related indication (for example, timing related indication). For example, the certain fields may be at least one of a time domain resource assignment (for example, time domain resource assignment) field and an HARQ-ACK feedback timing indication (for example, a PDSCH-to-HARQ feedback timing indicator) field.

When a certain physical shared channel is scheduled by a plurality of DCI transmitted in respective PDCCHs allocated to different time domains and the plurality of DCI have the same content (for example, payload content), the UE may interpret/apply time related information (or timing related information) included in the corresponding DCI, based on a specific time reference.

The time reference may be interpreted as a timing reference, reference timing, a reference point, a time reference point, a reference in the time domain, and a reference point in the time domain. The time reference may be interpreted as a reference of another parameter other than time.

The specific time reference may be a specific PDCCH of the plurality of repeatedly transmitted PDCCHs (or transmission timing of the specific PDCCH). For example, in one or more cases where transmission processing/reception processing is performed by using PDCCH repetition (for example, a plurality of PDCCHs/DCI), the UE may apply, as the specific time reference, at least one of reference A1 to reference A8 below to detection/reception of a PDCCH corresponding to DCI or scheduling of a DL channel/UL channel/RS. In other words, the UE may judge which PDCCH/DCI to refer to (value of which DCI is assumed to be indicated) among the PDCCHs/DCI received a plurality of times, based on at least one of reference A1 to reference A8 below.

Reference A1: first/last PDCCH repetition in the time domain (First/last PDCCH repetition in time domain)

Reference A2: first/last PDCCH repetition in the frequency domain (First/last PDCCH repetition in frequency domain)

Reference A3: PDCCH repetition with the lowest TCI state ID/highest TCI state ID (PDCCH repetition with lowest/highest TCI state ID)

Reference A4: PDCCH repetition with the lowest CORESET pool ID (or TRP ID)/highest CORESET pool ID (or TRP ID) (PDCCH repetition with lowest/highest CORESET Pool ID (TRP ID))

Reference A5: PDCCH repetition with the lowest control resource set ID/highest control resource set ID (PDCCH repetition with lowest/highest CORESET ID)

Reference A6: PDCCH repetition with the lowest search space index/highest search space index (PDCCH repetition with lowest/highest search space index)

Reference A7: PDCCH repetition with the lowest monitoring occasion/highest monitoring occasion (PDCCH repetition with lowest/highest monitoring occasion)

Reference A8: combination of any ones of A1 to A7

The first/last PDCCH repetition in the time domain may be any of a PDCCH ending last (end later), a PDCCH ending first (end earlier), a PDCCH starting last (start later), and a PDCCH starting first (start earlier) among the PDCCHs applied with repetition transmission.

Reference A1 corresponds to a case where the PDCCH transmitted (or received) first in PDCCH repetitions or a PDCCH allocated first in the time domain serves as a specific time reference, for example. The UE may assume the first symbol in the PDCCH transmitted first as the specific time reference or may assume the last symbol in the PDCCH as the specific time reference. Alternatively, the PDCCH transmitted (or received) last in PDCCH repetitions or a PDCCH allocated last in the time domain may serve as the specific time reference.

In reference A2, the PDCCH with the lowest control channel element (CCE) index/highest CCE index in PDCCH repetitions may serve as the specific time reference, for example. Alternatively, the PDCCH with the lowest PDCCH candidate index/highest PDCCH candidate index in PDCCH repetitions may serve as the specific time reference.

In reference A8, for example, by combining A1 and A4, the PDCCH transmitted first in the time domain among the PDCCHs with the lowest CORESET pool ID may serve as the specific time reference.

Note that the specific time reference may be determined based on a control resource set corresponding to the PDCCH instead of the PDCCH/DCI. For example, in one or more cases where transmission processing/reception processing is performed by using PDCCH repetition in a plurality of control resource sets, the UE may apply at least one of reference B1 to reference B8 below as a control resource set to serve as a reference for detection/reception of a PDCCH corresponding to DCI or scheduling of a DL channel/UL channel/RS. In other words, the UE may judge which control resource set to refer to (value of the DCI of which control resource set is assumed to be indicated) among the PDCCHs/DCI received a plurality of times (for example, in a case of control resource set repetition), based on at least one of reference B1 to reference B8 below.

> Reference B1: control resource set of first PDCCH repetition/last PDCCH repetition in the time domain (CORESET of first/last PDCCH repetition in time domain)
> Reference B2: control resource set of first PDCCH repetition/last PDCCH repetition in the frequency domain (CORESET of first/last PDCCH repetition in frequency domain)
> Reference B3: control resource set with the lowest resource block (or resource block group)/highest resource block (or resource block group) (CORESET with lowest/highest RB/RBG)
> Reference B4: control resource set with the lowest TCI state ID/highest TCI state ID (CORESET with lowest/highest TCI state ID)
> Reference B5: control resource set with the lowest CORESET pool ID (or TRP ID)/highest CORESET pool ID (or TRP ID) (CORESET with lowest/highest CORESET Pool ID (TRP ID))
> Reference B6: control resource set with the lowest control resource set ID/highest control resource set ID (CORESET with lowest/highest CORESET ID)
> Reference B7: control resource set with the lowest search space index/highest search space index (CORESET associated with lowest/highest search space index)
> Reference B8: combination of any ones of B1 to B7

The CORESET of the first/PDCCH repetition/last PDCCH repetition in the time domain may be any of the CORESET corresponding to a PDCCH ending last (end later), the CORESET corresponding to a PDCCH ending first (end earlier), the CORESET corresponding to a PDCCH starting last (start later), and the CORESET corresponding to a PDCCH starting first (start earlier) among the CORESETS corresponding to respective PDCCHs applied with repetition transmission. Alternatively, the CORESET of the first PDCCH repetition/last PDCCH repetition in the time domain may be any of a CORESET ending last (end later), a CORESET ending first (end earlier), a CORESET starting last (start later), and a CORESET starting first (start earlier)

among the CORESETs corresponding to the PDCCHs applied with repetition transmission.

In reference B8, for example, by combining B5 and B6, the control resource set with the lowest control resource set ID among the PDCCHs with the lowest CORESET pool ID may serve as a reference (for example, the specific time reference).

<Application Cases>

The present embodiment may be applied in at least one of case 0 to case 13 below as one or more cases where transmission processing/reception processing is performed by using PDCCH repetition (for example, a plurality of PDCCHs/DCI).

<<Case 0>>

References A1 to A8 (referred to simply as reference A below)/references B1 to B8 (referred to simply as reference B below) may be applied to control of transmission timing (for example, a time domain resource) of a physical shared channel (for example, a PDSCH/PUSCH) scheduled by PDCCH/DCI repetition.

For example, the UE may judge a time domain resource of the signal/channel (for example, the physical shared channel) scheduled by each DCI, based on a specific time reference and a time related information notification field included in the DCI (at least one piece of DCI).

For example, when the slot offset K0/K2 specified by each DCI has the same value (for example, K0=2), the UE only needs to judge that the PDSCH/PUSCH is scheduled in a slot K0/K2 away from the specific time reference.

{Group-Common DCI}

Reference A/reference B may be applied to control of transmission processing/reception processing, based on group-common DCI (for example, group common DCI). The group-common DCI may be DCI format 2_0 (case 1), DCI format 2_1 (case 2), DCI format 2_4 (case 3), or DCI format 2_5 in Rel. 16 and later versions, for example. It is apparent that applicable group-common DCI formats are not limited to these.

<<Case 1>>

DCI format 2_0 is used for notification of a slot format. For example, the UE judges a slot format (for example, a method of transmitting each symbol (for example, UL/DL/flexible)) for a certain number of slots in a DL BWP/UL BWP, based on the value of a field (for example, an SFI index field) in DCI format 2_0.

When a plurality of DCI formats 2_0 are transmitted by using PDCCH repetition in this way, a problem is from which position (for example, which slot) information of the slot format notified by DCI formats 2_0 is to start.

In view of this, in the present embodiment, when a plurality of DCI formats 2_0 are transmitted by using PDCCH repetition (or PDCCHs transmitted repeatedly), the UE may control transmission processing/reception processing, based on reference A/reference B.

Figure 4:
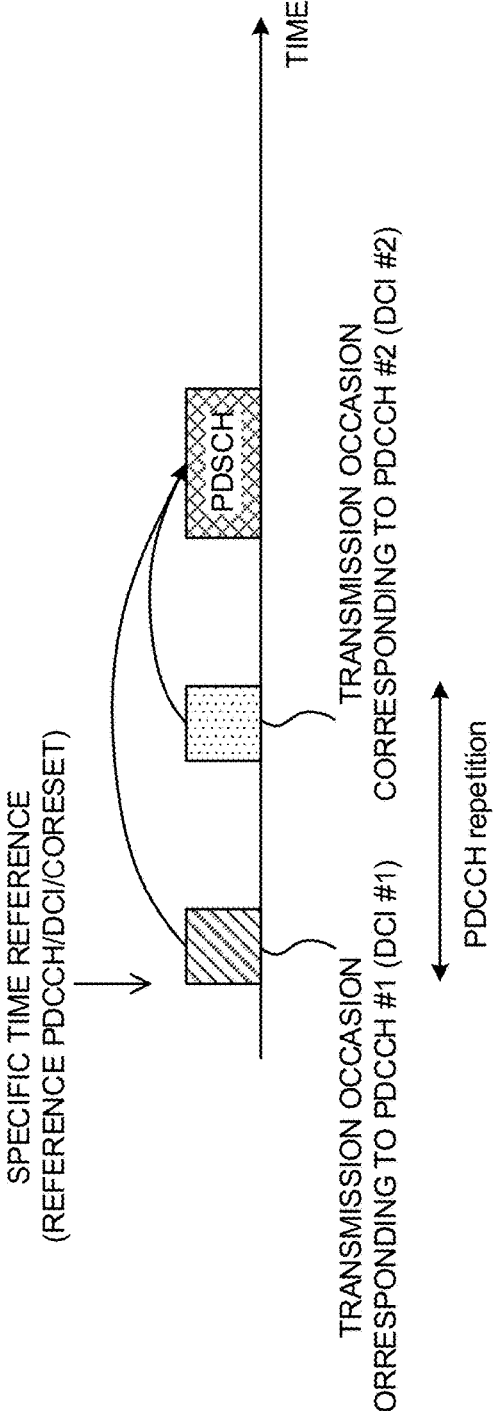
FIG. 4 is a diagram to show an example of communication control using PDCCH repetition in the present embodiment.

For example, the UE may apply/interpret slot format information notified by DCI formats 2_0, based on a specific time reference (for example, reference A/reference B) to control transmission processing/reception processing (refer to FIG. 4). FIG. 4 shows a case of using PDCCH #1 (DCI #1) as a specific reference (for example, the first repetition PDCCH in reference A1) in PDCCH repetition (here, PDCCH #1 (DCI #1) and PDCCH #2 (DCI #2)).

With this, even when a plurality of DCI formats 2_0 are repeatedly transmitted, the UE can appropriately determine a slot format.

13

<<Case 2>>

DCI format 2_1 is used for notification of a resource block(s) (for example, a PRB(s)) and a symbol(s) for which the UE may assume that transmission is not intended. For example, the UE may judge a resource block(s) (for example, a PRB(s)) and a symbol(s) for which transmission is not intended, based on information included in DCI format 2_1 (for example, pre-emption indication). For example, when the UE detects DCI format 2_1, the UE may assume that no transmission to the UE is performed in a set of symbols notified by DCI format 2_1, based on the PRB in last monitoring duration and a set of symbols.

When the UE detects DCI format 2_1 in a PDCCH transmitted in a control resource set in a slot, the set of symbols are the last $N_{symb}^{slot} \cdot T_{INT} \cdot 2^{\mu - \mu INT}$ symbols before the first symbol in the control resource set in the slot. $T_{INT}$ corresponds to PDCCH monitoring periodicity provided by higher layer signaling, $N_{symb}^{slot}$ corresponds to the number of symbols per slot, p corresponds to a differential subcarrier spacing configuration (SCS configuration) of a serving cell mapped to each field of DCI format 2_1, and $P_{INT}$ corresponds to a subcarrier spacing configuration of a DL BWP in which the UE receives the PDCCH in DCI format 2_1.

When a plurality of DCI formats 2_1 are transmitted by using PDCCH repetition in this way, a problem is based on which control resource set the information notified by DCI formats 2_1 is to be applied/interpreted.

In view of this, in the present embodiment, when a plurality of DCI formats 2_1 are transmitted by using PDCCH repetition (or PDCCHs transmitted repeatedly), the UE may control transmission processing/reception processing, based on reference A/reference B.

For example, the UE applies/interprets the information notified by DCI formats 2_1, based on a specific control resource set (for example, reference B) to control transmission processing/reception processing. With this, even when a plurality of DCI formats 2_1 are repeatedly transmitted, the UE can appropriately control communication.

<<Case 3>>

DCI format 2_4 is used for notification of a PRB(s) and a symbol(s) for which corresponding UL transmission is canceled. For example, the UE may judge a PRB(s) and a symbol(s) for which UL transmission is canceled, based on information included in DCI format 2_4 (for example, cancellation indication).

The indication by DCI format 2_4 may be applied to PUSCH transmission/SRS transmission. When the PUSCH transmission/SRS transmission is scheduled by a DCI format, the indication by DCI format 2_4 is applied to the PUSCH transmission/SRS transmission only when the last symbol in PDCCH reception corresponding to the DCI format is earlier than the first symbol in PDCCH reception corresponding to DCI format 2_4.

The UE may apply/interpret information notified by DCI format 2_4 to control the PUSCH transmission/SRS transmission, based on the last timing of the PDCCH reception in which DCI format 2_4 is detected/last symbol in the control resource set in which DCI format 2_4 is detected.

The UE does not expect to cancel PUSCH transmission or SRS transmission before a certain symbol after the last symbol in the control resource set in which DCI format 2_4 is detected.

When a plurality of DCI formats 2_4 are transmitted by using PDCCH repetition in this way, a problem is based on which PDCCH repetition/control resource set the information notified by DCI formats 2_4 is to be applied/interpreted.

In view of this, in the present embodiment, when a plurality of DCI formats 2_4 are transmitted by using PDCCH repetition (or PDCCHs transmitted repeatedly), the UE may control transmission processing/reception processing, based on reference A/reference B.

For example, the UE may apply/interpret the information notified by DCI formats 2_4, based on a specific time reference (for example, reference A/reference B) to control transmission processing/reception processing. With this, even when a plurality of DCI formats 2_4 are repeatedly transmitted, the UE can appropriately control communication.

Different time references may be applied to PDCCH reception corresponding to a DCI format for scheduling PUSCH transmission/SRS transmission and PDCCH reception corresponding to DCI format 2_4.

<<Case 4>>

DCI format 2_5 is used for notification of availability of a soft resource. For example, the UE may judge a soft resource to be available, based on the value of information included in DCI format 2_5 (for example, availability notification (Availability Indicator (AI))).

It is studied to use the IAB (Integrated Access Backhaul) technique using NR communication as backhaul between base stations (or between a base station and a relay station). In particular, it is expected that IAB using NR communication using millimeter waves can expand coverage areas at low cost.

An IAB node may have at least one function such as a DU (Distribution Unit), a CU (Central Unit), an MT (Mobile Termination), and the like. Hence, the IAB node may function as a base station or may function as a user terminal (UE (User Equipment)).

The value of the availability notification (for example, an AI index) field in DCI format 2_5 indicates, to an IAB-DU, availability of a soft symbol(s) in each of slots corresponding to the number of slots starting from the earliest slot of an IAB-DT overlapping in terms of time with a slot of an IAB node in which the IAB-DU has detected DCI format 2_5. The number of slots is equal to or larger than PDCCH monitoring periodicity of DCI format 2_5 provided by a higher layer parameter related to search space.

When a plurality of DCI formats 2_5 are transmitted by using PDCCH repetition in this way, a problem is which position is to be assumed for the slot in which DCI format 2_5 is detected.

In view of this, in the present embodiment, when a plurality of DCI formats 2_5 are transmitted by using PDCCH repetition (or PDCCHs transmitted repeatedly), the UE may control transmission processing/reception processing, based on reference A/reference B.

For example, the UE may apply/interpret the information notified by DCI formats 2_5, based on a specific time reference (for example, reference A/reference B) to control transmission processing/reception processing. With this, even when a plurality of DCI formats 2_5 are repeatedly transmitted, the UE can appropriately control communication.

{PDSCH/PUSCH Scheduling}

Reference A/reference B may be applied to control of transmission processing/reception processing, based on DCI/PDCCH used for PDSCH/PUSCH scheduling operation. The PDSCH/PUSCH scheduling operation may be allocation of a resource (for example, a frequency resource) (case 5), scheduling restriction for PDSCH (case 6), or in/out-of-order for PDSCH/PUSCH (case 7).

<<Case 5>>

Resource (for example, RB) allocation to a PDSCH is determined based on a control resource set in which the UE has received DCI. For example, when a PDSCH is scheduled by DCI format 1_0 in a certain type of a PDCCH common search space, resource block numbering (RB numbering) starts from the lowest RB in the control resource set in which DCI is received irrespective of which bandwidth part is an active BWP. In other cases, RB numbering starts from the lowest RB in a determined DL BWP (certain BWP).

When a plurality of DCI formats each including frequency domain resource allocation information are transmitted by using PDCCH repetition in this way, a problem is based on which DCI (or control resource set) resource allocation is to be controlled, for example, based on which DCI/control resource set RB, RB numbering is to start.

In view of this, in the present embodiment, when a plurality of DCI formats each including frequency domain resource allocation information are transmitted by using PDCCH repetition (or PDCCHs transmitted repeatedly), the UE may control transmission processing/reception processing (for example, determine a resource to be allocated), based on reference A/reference B.

For example, the UE may judge frequency domain resource allocation, based on a PDCCH/DCI/control resource set determined based on a specific time reference (for example, reference A/reference B). With this, even when a plurality of DCI formats each including PDSCH frequency domain resource related information are repeatedly transmitted, the UE can appropriately judge a PDSCH frequency domain resource.

Resource (for example, RB) allocation to a PUSCH is determined based on the CCE index of a PDCCH in DCI detected by the UE. For example, an uplink RB set for DCI format 0_0 monitored in a common search space CRC-scrambled with an RNTI other than a certain RNTI (for example, a TC-RNTI) may be an RB set with the lowest index among uplink RB sets intersecting with the CCE with the lowest index in the PDCCH in which the UE has detected DCI format 0_0 in an active DL BWP. When there is no intersection, the uplink RB set may be RB set 0 in an active UL BWP.

When a plurality of DCI formats each including frequency domain resource information are transmitted by using PDCCH repetition, a problem is that resource allocation is to be controlled based on a PDCCH corresponding to which DCI, for example, an RB set is to be judged based on the lowest CCE in a PDCCH corresponding to which DCI.

In view of this, in the present embodiment, when a plurality of DCI formats each including frequency domain resource allocation information are transmitted by using PDCCH repetition (or PDCCHs transmitted repeatedly), the UE may control transmission processing/reception processing (for example, determine a resource to be allocated), based on reference A/reference B.

For example, the UE may judge frequency domain resource allocation (for example, an RB set), based on a PDCCH/DCI determined based on a specific time reference (for example, reference A/reference B). With this, even when a plurality of DCI formats each including PDSCH frequency domain resource related information are repeatedly transmitted, the UE can appropriately judge a PUSCH frequency domain resource.

<<Case 6>>

Reception of a PDSCH in a certain mapping type is restricted in some timing of receiving a PDCCH scheduling the PDSCH (for example, relationship with PDSCH time allocation). For example, when the first symbol in the PDCCH scheduling the PDSCH is received in a symbol later than the first symbol indicated with the PDSCH time domain resource allocation, the UE does not assume to receive a PDSCH with mapping type B in a slot.

When a PDSCH is scheduled by using PDCCH repetition in this way, a problem is that resource restriction is to be controlled based on a symbol of which PDCCH, for example, the first symbol of which PDCCH and the first symbol of a PDSCH time domain resource are to be compared.

In view of this, in the present embodiment, when a plurality of DCI formats for scheduling a PDSCH are transmitted by using PDCCH repetition (or PDCCHs transmitted repeatedly), the UE may control transmission processing/reception processing, based on reference A/reference B.

For example, the UE may control whether a PDSCH having a certain mapping type (for example, mapping type B) is received, based on a symbol (first symbol) of the PDCCH determined based on a specific time reference (for example, reference A/reference B). With this, even when a plurality of DCI formats to be used for scheduling of a PDSCH are repeatedly transmitted, the UE can appropriately judge reception of the PDSCH.

<<Case 7>>

PDSCH reception processing based on DCI and PUSCH transmission processing based on DCI are carried out as in-order/out-of-order (in/out-of-order). In-order corresponds to a case where transmission/reception processing of a PDSCH/PUSCH is performed in the order of receiving DCI, and out-of-order corresponds to a case where transmission/reception processing of a PDSCH/PUSCH is performed irrespective of the order of receiving DCI. An example of PDSCH reception processing/PUSCH transmission processing based on DCI will be described below.

For example, assumed is a case where, for two HARQ process IDs in a certain scheduled cell, the UE is scheduled to initiate reception of a first PDSCH starting at symbol j by a PDCCH ending with symbol i. In this case, the UE need not assume that reception of a PDSCH starting earlier than the ending of the first PDSCH is scheduled by the PDCCH ending later than symbol i.

In a certain condition, except for a case where a PDCCH scheduling a PDSCH ends at least 14 symbols before the earliest start symbol of a PDSCH not involving corresponding PDCCH transmission, the UE may perform control to decode the PDSCH scheduled by the PDCCH.

Also assumed is a case where, for two HARQ process IDs in a certain scheduled cell, the UE is scheduled to initiate reception of a first PDSCH starting at symbol j by a PDCCH associated with the value of a CORESET pool index ending with symbol i. In this case, the UE may be scheduled with reception of a PDSCH starting earlier than the ending of the first PDSCH by the PDCCH associated with a different value of a CORESET pool index ending later than symbol i.

Also assumed is a case where, for two HARQ process IDs in a certain scheduled cell, the UE is scheduled to initiate transmission of a first PUSCH starting at symbol j by a PDCCH ending with symbol i. In this case, the UE need not assume that transmission of a PUSCH starting earlier than the ending of the first PUSCH is scheduled by the PDCCH ending later than symbol i.

Also assumed is a case where, for two HARQ process IDs in a certain scheduled cell, the UE is scheduled to initiate transmission of a first PUSCH starting at symbol j by a PDCCH associated with the value of a CORESET pool index ending with symbol i. In this case, the UE may be scheduled with transmission of a PUSCH starting earlier than the ending of the first PDSCH by the PDCCH associated with a different value of a CORESET pool index ending later than symbol i.

When the end of symbol i is at least not an N2 symbol(s) before starting of symbol j, the UE may assume that transmission of a PUSCH is not scheduled by the PDCCH ending at symbol i in a serving cell overlapping at a time with a certain transmission occasion. The certain transmission occasion may start at symbol j in the same serving cell. N2 may be a value determined based on UE capability.

In a certain condition, when the gap between the end of PDCCH of symbol i and the start of PUSCH transmission of symbol j is equal to or larger than the N2 symbol(s), the UE may assume to terminate repetition of a transport block in the PUSCH transmission starting from symbol j. The certain condition may be a case where the UE receives ACK for a certain HARQ process in a CG-DFI in the PDCCH ending at symbol i, in order to terminate repetition in configured grant based PUSCH transmission in a certain serving cell with the same HARQ process after symbol i.

a certain index ($r_{PUCCH}$). The certain index ($0 \leq r_{PUCCH} \leq 15$) may be expressed by Equation (1) below.

[Math. 1]

$$r_{PUCCH} = \left\lfloor \frac{2 \cdot n_{CCE,o}}{N_{CCE}} \right\rfloor + 2 \cdot \Delta_{PRI} \qquad \text{Equation (1)}$$

$N_{CCE}$ denotes the number of CCEs in a control resource set for PDCCH reception corresponding to the DCI format.

$n_{CCE,\ 0}$ denotes the first CCE index in the PDCCH reception.

$\Delta_{PRI}$ is the value of a PUCCH resource identifier field in the DCI format.

When the size of a resource list for the first set of PUCCH resources is larger than a certain value (for example, 8), the UE determines the PUCCH resource with the certain index ($r_{PUCCH}$) when the UE transmits an HARQ-ACK in response to detection of the last DCI format in PDCCH repetition. The certain index ($0 \leq r_{PUCCH} \leq R_{PUCCH} - 1$) may be expressed by Equation (2) below. The transmission of the HARQ-ACK may correspond to PUCCH transmission transmitted in the same slot.

{Math. 2]

$$r_{PUCCH} = \begin{cases} \left\lfloor \frac{n_{CCE,p} \cdot \lfloor R_{PUCCH}/8 \rfloor}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases} \qquad \text{Equation (2)}$$

In a certain condition, the UE need not assume that transmission of a PUSCH in the serving cell corresponding to a certain HARQ process is scheduled by the PDCCH ending at symbol i. The certain condition may be a case where a transmission occasion in which a configured grant based PUSCH with the same HARQ process in the same serving cell starting at symbol j is present after symbol i and the gap between the end symbol of the PDCCH and start of symbol j is smaller than the N2 symbol(s).

As described above, in the reception processing for a PDSCH/transmission processing for a PUSCH based on DCI, the UE controls the PDCCH/DCI as a reference (for example, a time reference). When the reception processing for a PDSCH/reception processing for a PUSCH is performed by using PDCCH repetition, a problem is based on which PDCCH/DCI control is to be performed.

In view of this, in the present embodiment, when PDSCH reception/PUSCH transmission is controlled based on in-order/out-of-order (in/out-of-order) by using PDCCH repetition (or PDCCHs transmitted repeatedly), the UE may control transmission processing/reception processing, based on reference A/reference B. With this, even when a plurality of PDCCHs/DCI are repeatedly transmitted, the UE can appropriately control reception processing for a PDSCH/transmission processing for a PUSCH.

<<Case 8>>

The resource of an uplink control channel (for example, a PUCCH) is determined based on a CCE index corresponding to a PDCCH. For example, when the UE transmits an HARQ-ACK by using a PUCCH in response to PDSCH reception/detection of a DCI format for scheduling SPS PDSCH release, the UE determines a PUCCH resource with $N_{CCE,\ p}$ denotes the number of CCEs in a control resource set p for PDCCH reception corresponding to the DCI format.

$n_{CCE,\ 0}$ denotes the first CCE index in the PDCCH reception.

$\Delta_{PRI}$ is the value of a PUCCH resource identifier field in the DCI format.

When a plurality of PDCCHs/DCI/control resource sets each including PUCCH resource information (for example, information of a CCE index) are transmitted by using PDCCH repetition in this way, a problem is based on which PDCCH/DCI/control resource set a PUCCH resource is to be determined.

In view of this, in the present embodiment, when the resource for a PUCCH corresponding to a PDSCH scheduled by using PDCCH repetition (or PDCCHs transmitted repeatedly) (for example, a PUCCH for HARQ-ACK transmission corresponding to the PDSCH) is determined, the UE may control transmission processing/reception processing (for example, determine a PUCCH resource), based on reference A/reference B. The PUCCH corresponding to a PDSCH scheduled by using PDCCH repetition may be interpreted as a PUCCH triggered by using PDCCH repetition.

For example, the UE may judge the resource for the PUCCH, based on a PDCCH/DCI/control resource set determined based on a specific time reference (for example, reference A/reference B). As an example, the UE may use a CCE corresponding to the PDCCH/control resource set determined based on the specific time reference, to determine a PUCCH resource. With this, even when PDCCHs/DCI/control resource sets are repeatedly transmitted, the UE can appropriately judge a PUCCH resource.

<<Case 9>>

The resource for a sounding reference signal (SRS) is determined based on an SRI (Sounding Reference Indicator) or a PDCCH with the SRI. For example, an SRI indicated in slot n may be associated with the most recent transmission of SRS resource identified by the SRI. The SRS resource is arranged/configured before a PDCCH transmitting the SRI.

When a plurality of PDCCHs/DCI each including information related to an SRI are transmitted by using PDCCH repetition in this way, a problem is based on which PDCCH/DCI an SRS resource is to be determined.

In view of this, in the present embodiment, when SRS transmission is controlled based on PDCCH repetition (or PDCCHs transmitted repeatedly), the UE may control transmission processing (for example, determination of an SRS resource)/reception processing (for example, reception of DCI including an SRI) for an SRS, based on reference A/reference B.

For example, the UE may judge the resource for the SRS, based on a PDCCH/DCI determined based on a specific time reference (for example, reference A/reference B). With this, even when PDCCHs/DCI/control resource sets are repeatedly transmitted, the UE can appropriately judge an SRS resource.

<<Case 10>>

In intermittent reception (DRX) control, a certain timer (for example, a DRX timer) is controlled based on whether new transmission of a PDCCH is notified. For example, when a PDCCH notifies of new transmission (DL or UL) in the serving cell of a certain DRX group, the UE starts/restarts the timer of the DRX group (for example, drx-InactivityTimer) at the first symbol after termination of PDCCH reception.

When a certain timer in DRX control is controlled based on PDCCHs transmitted by PDCCH repetition in this way, a problem is based on which PDCCH/DCI the certain timer is to be controlled (for example, started/restarted).

In view of this, in the present embodiment, when DRX is controlled based on PDCCH repetition (or PDCCHs transmitted repeatedly), the UE may control control of DRX (for example, start/restart of the timer), based on reference A/reference B.

For example, the UE may control start/restart of a timer of a DRX group (for example, drx-InactivityTimer) at the first symbol after termination of reception of a PDCCH determined based on a specific time reference (for example, reference A/reference B).

<<Case 11>>

Change/switching/switch of a bandwidth part (BWP) is controlled based on timing of receiving a PDCCH/DCI. For example, when the UE detects DCI format indicating change of an active DL BWP (DL BWP change) in a certain cell, the UE need not be requested for reception or transmission in a cell in a period from end of the third symbol in a slot where the UE receives a PDCCH including a DCI format in a scheduling cell to start of a slot indicated by a slot offset value in the time domain resource assignment field in the DCI format.

When the UE detects DCI format indicating change of an active UL BWP (UL BWP change) in a certain cell, the UE need not be requested for reception or transmission in a cell in a period from end of the third symbol in a slot where the UE receives a PDCCH including a DCI format in a scheduling cell to start of a slot indicated by a slot offset value in the time domain resource assignment field in the DCI format.

When change/switching/switch of a BWP is controlled based on PDCCHs transmitted by PDCCH repetition in this way, a problem is based on which PDCCH/DCI the control is to be performed.

In view of this, in the present embodiment, when change/switching/switch of a BWP is controlled based on PDCCH repetition (or PDCCHs transmitted repeatedly), the UE may perform the control, based on a PDCCH determined based on reference A/reference B.

For example, the UE may control the change/switching/switch of a BWP, based on a PDCCH determined based on a specific time reference (for example, reference A/reference B).

<<Case 12>>

Use of a resource to be used for a PDSCH is restricted depending on whether the resource overlaps the resources of the control resource set corresponding to the PDCCH/DCI for scheduling the PDSCH. For example, a PDSCH scheduled by the PDCCH overlaps a resource in the control resource set including the PDCCH, resources corresponding to the PDCCH scheduling the PDSCH (for example, the PDCCH detected by the UE) and a DMRS for a related PDCCH cannot be used for the PDSCH.

When part of PDCCH repetitions is not detected by the UE in a case of including a plurality of PDCCH candidates for the PDCCH repetitions in this way, a problem is whether all the PDCCH candidates for the PDCCH repetitions cannot be used for the PDSCH or only the detected PDCCH cannot be used for the PDSCH.

In the present embodiment, when the PDSCH scheduled by the PDCCH overlaps a resource in the control resource set including the PDCCH repetitions, in the PDCCH repetitions, option 12-1 or option 12-2 below may be applied.

{Option 12-1}

The UE may judge/assume that the PDCCH scheduling the PDSCH (for example, the PDCCH detected by the UE) and the resource corresponding to a union of the DMRS for the related PDCCH are not used for the PDSCH, for control.

{Option 12-2}

The UE may perform control not to use the PDCCH scheduling the PDSCH (for example, the PDCCH detected by the UE) and the resource corresponding to a union of the DMRS for the related PDCCH, for the PDSCH. Further, the UE may judge/assume that resources corresponding to PDCCH candidates associated with the PDCCH detected as PDCCH repetitions and the DMRS for the related PDCCH are not used for the PDSCH, for control.

Associations between PDCCH candidates/control resource sets/search space sets for PDCCH repetitions may be defined in a specification or may be configured for the UE by a base station by higher layer signaling or the like.

<<Case 13>>

A MAC entity (for example, the UE) performs monitoring for a PDCCH occasion in DRX control, for example, but when it is not a complete PDCCH occasion, monitoring of a PDCCH is not needed (is not required). Not being a complete PDCCH occasion may be a case where an active time starts/stops in the middle of the PDCCH occasion, for example.

When an active time starts/stops in the middle of two PDCCH repetitions in a case of PDCCH repetition in this way, a problem is whether the MAC entity needs to monitor a PDCCH occasion (or how to control the monitoring).

In the present embodiment, in DRX control, when PDCCH repetition is not a complete PDCCH repetition in a case where PDCCH repetition is applied, at least one of option 13-1 to option 13-4 below may be applied. PDCCH repetition not being a complete PDCCH repetition may be a case where an active time starts/stops in the middle of PDCCH repetition, for example.

{Option 13-1}

Figure 5:
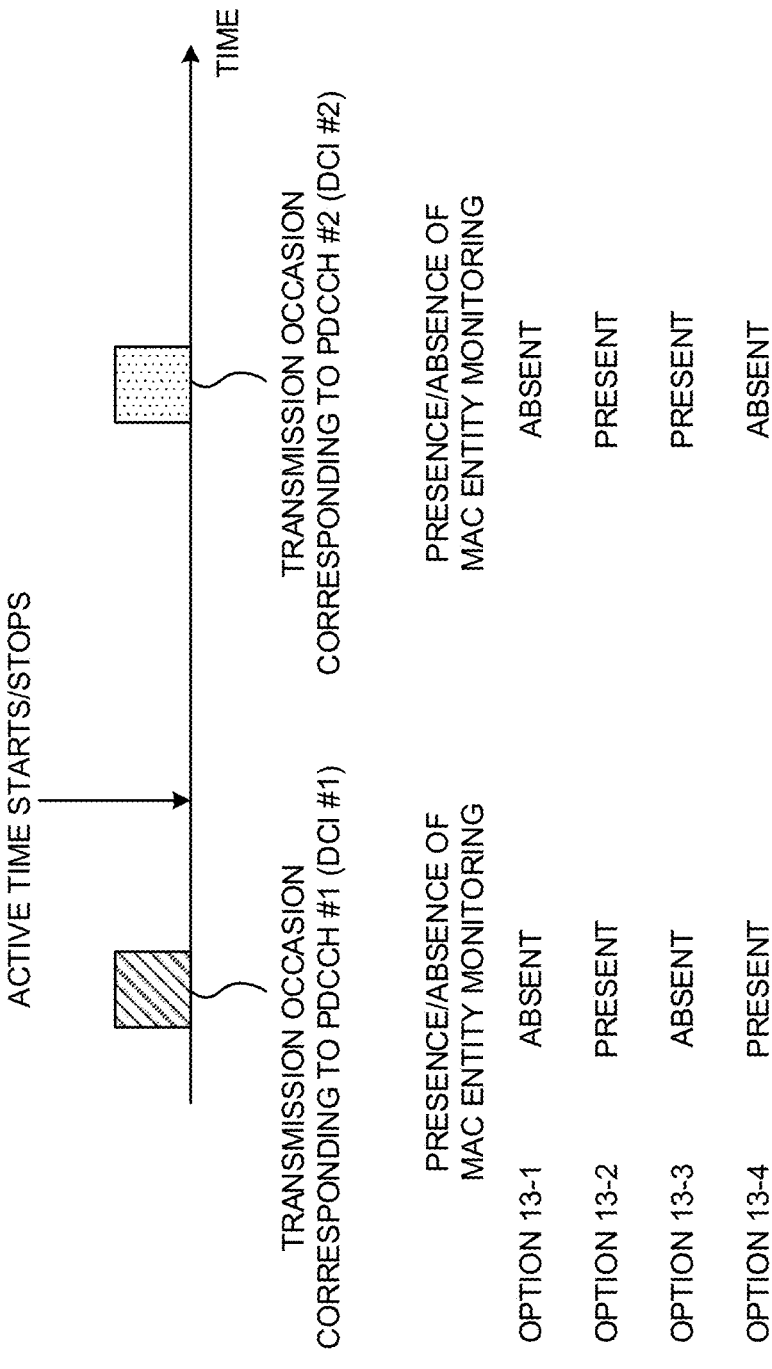
FIG. 5 is a diagram to show another example of the communication control using PDCCH repetition in the present embodiment.

The MAC entity may be configured not to need to monitor all PDCCH repetitions (or not to be required to monitor all the PDCCH repetitions) (refer to FIG. 5). FIG. 5 shows a case where an active time starts/stops between the occasion of PDCCH repetition #1 and the occasion of PDCCH repetition #2. In this case, the MAC entity may be configured not to be required to monitor PDCCHs in the occasion of PDCCH repetition #1 and the occasion of PDCCH repetition #2.

{Option 13-2}

The MAC entity may be configured to need to monitor all PDCCH repetitions (or to be required to monitor all the PDCCH repetitions) (refer to FIG. 5). In FIG. 5, the MAC entity may be configured to be required to monitor PDCCHs in the occasion of PDCCH repetition #1 and the occasion of PDCCH repetition #2.

{Option 13-3}

The MAC entity may be configured to need to monitor PDCCH repetition after start/stop of an active time (or to be required to monitor only PDCCH repetition after start/stop of an active time) (refer to FIG. 5). In FIG. 5, the MAC entity may be configured to be required to monitor a PDCCH in the occasion of PDCCH repetition #2 without being required to monitor a PDCCH in the occasion of PDCCH repetition #1.

{Option 13-4}

The MAC entity may be configured to need to monitor PDCCH repetition before start/stop of an active time (or to be required to monitor only PDCCH repetition before start/stop of an active time) (refer to FIG. 5). In FIG. 5, the MAC entity may be configured to be required to monitor a PDCCH in the occasion of PDCCH repetition #1 without being required to monitor a PDCCH in the occasion of PDCCH repetition #2.

{Variations}

Application of separate options may be supported/permitted for a case where an active time starts in the middle of PDCCH repetition and a case where an active time stops in the middle of PDCCH repetition. With this, monitoring of PDCCH repetition can be controlled more flexibly.

Associations between PDCCH candidates/control resource sets/search space sets for PDCCH repetitions may be defined in a specification or may be configured for the UE by a base station by higher layer signaling or the like.

(UE Capability Information)

The UE may report about whether PDCCH repetition is supported as UE capability to the base station. For example, the UE may report about whether a multiplexing scheme (TDM/SDM/FDM) applicable to PDCCH repetition is supported, to the base station.

The UE may report which one to support among inter-slot PDCCH repetition, intra-slot PDCCH repetition, and intra-mini-slot PDCCH repetition for PDCCH repetitions transmitted in different time domains (TDM PDCCH repetition), to the base station.

The UE may report UE capability related to the number (for example, the maximum number) of repetitions to the base station. The maximum number of repetitions may be separately configured or may commonly configured for a plurality of multiplexing schemes (TDM/SDM/FDM).

The UE may report which one to support between a case where DCI payload contents are the same and a case where DCI payload contents are different from each other in repetition PDCCH (for example, inter-slot/intra-slot/intra-mini-slot TDM PDCCH repetition).

The UE may report whether to support notification of the number of repetitions based on DCI to the base station.

The UE may report whether to support PDCCH repetition by soft combining to the base station. Alternatively, the UE may report whether to support PDCCH repetition without soft combining to the base station.

The base station may control PDCCH repetition transmission, based on the capability information reported by the UE. The base station may notify the UE of/configure for the UE the above-described UE capability information by using higher layer signaling or the like.

Note that the present embodiment may be applied to multi-chance PDCCH transmission. For example, DCI for scheduling the same PDSCH/PUSCH/RS/TB or the like and DCI having the same outcome may be differentiated from each other.

(PDCCH Repetition Related Information/Configuration Information)

Information/configuration information related to PDCCH repetition transmission may be a transmission condition/transmission parameter applied to the PDCCH repetition transmission. The transmission condition/transmission parameter applied to the PDCCH repetition may be at least one of the number of PDCCH repetitions (for example, PDCCH repetition number), a time section to which the PDCCH repetition is applied, and spacing/offset between PDCCHs in PDCCH repetition transmission.

The PDCCHs to which repetition transmission is applied (for example, multi-PDCCH) may be transmitted from a plurality of respective TRPs. The multi-PDCCH (or the PDCCHs transmitted from the different TRPs) may be applied with different QCLs (or TCIs, beams). In the present disclosure, PDCCH repetition transmission is applicable to a case of being transmitted from one or a plurality of TRPs.

The UE may be notified of/configured with the information related to PDCCH repetition transmission (for example, the number of PDCCH repetitions) by the network (for example, the base station). The UE may be notified of/configured with the information related to PDCCH repetition transmission, based on at least one of option 1-A to option 1-B below.

<Option 1-A>

The UE may be notified of/configured with the information related to PDCCH repetition transmission by the base station by using higher layer signaling (for example, at least one of an RRC parameter and a MAC CE).

<Option 1-B>

The UE may be dynamically notified of the information related to PDCCH repetition transmission by the base station by using downlink control information (for example, DCI). The information related to PDCCH repetition transmission may be notified by using a new field configured for DCI or may be notified by using a field configured in an existing system.

The information related to PDCCH repetition transmission may be included in each PDCCH/DCI to which repetition transmission is applied. In this case, the number of PDCCH repetitions included in each PDCCH/DCI may be the same value. Alternatively, a different value (for example, a remaining number of repetitions) may be configured for the number of PDCCH repetitions included in each PDCCH/DCI.

The size (for example, the number of bits) of a field to be used for notification of the information related to repetition transmission may be determined based on the maximum number of PDCCH repetitions. The UE may judge the maximum number of PDCCH repetitions, based on the capability information reported by the UE (for example, UE capability).

Alternatively, the UE may be notified of/configured with the maximum number of PDCCH repetitions by the base station by higher layer signaling or the like. In this case, the base station may notify the UE of the number of PDCCH repetitions actually applied by using DCI. The size (or the number of bits) of a field to be used for notification of the number of PDCCH repetitions may be determined based on the maximum number of PDCCH repetitions notified/configured by higher layer signaling.

Whether notification of the number of PDCCH repetitions using DCI is applied may be configured by certain higher layer signaling. When the certain higher layer signaling is configured, the UE may assume that a field for notification of the number of PDCCH repetitions is present in DCI. When the certain higher layer signaling is not configured, the UE may assume that a field for notification of the number of PDCCH repetitions is absent in DCI.

When PDCCH repetition transmission is applied in this way, by the UE being notified of/configured with information related to PDCCH repetition by the base station, the UE can appropriately grasp a transmission condition/transmission parameter to be applied to PDCCH repetition transmission.

(PDCCH Repetition Control Corresponding to Common Search Space)

When repetition transmission is applied to a downlink control channel (or a CORESET/downlink control channel candidate/search space/search space set) to be used for transmission of UE-common DCI (or DCI transmitted by using a common search space set), the UE may apply at least one of a first aspect to a fifth aspect below.

The first aspect to the fifth aspect may be applied to a DCI format using a common search space set. The DCI format may be, for example, DCI format 2_0/2_1/2_4/2_5 or may be another DCI format. The common search space set (for example, CSS PDCCHs) may be a Type0/0A/1/2/3-PDCCH CSS set, for example.

The first aspect to the fifth aspect may each be employed separately, or may be employed partially or entirely in combination. The first aspect to the fifth aspect may be employed separately from or may be employed partially or entirely in combination with cases 1 to 13 above.

<First Aspect>

In the first aspect, how to configure aggregation levels and the numbers of PDCCH candidates for one or more search spaces (for example, linked search space sets (linked SS sets)) applied to/configured for PDCCH repetition will be described. The aggregation levels may correspond to CCE (Control Channel Element) aggregation level.

In the following description, a case where the number of associated/linked search space sets is two is taken as an example. However, the number of linked search space sets may be three or more.

For a certain DCI format (for example, DCI format 2_0/2_4/2_5), a CORESET corresponding to each search space set is configured by a higher layer parameter (for example, SearchSpace). The aggregation levels for each search space set and the number of PDCCH candidates for each aggregation level are configured by the higher layer parameter (refer to FIG. 6).

FIG. 6 shows an example of a higher layer parameter (for example, SearchSpace) used for configuration of search spaces in an existing system (for example, Rel. 15/16). By the higher layer parameter, when common is configured as a search space type, the number of PDCCH candidates for each aggregation level is configured for the certain DCI format (here, DCI format 2_0, 2_4, 2_5).

Figure 7:
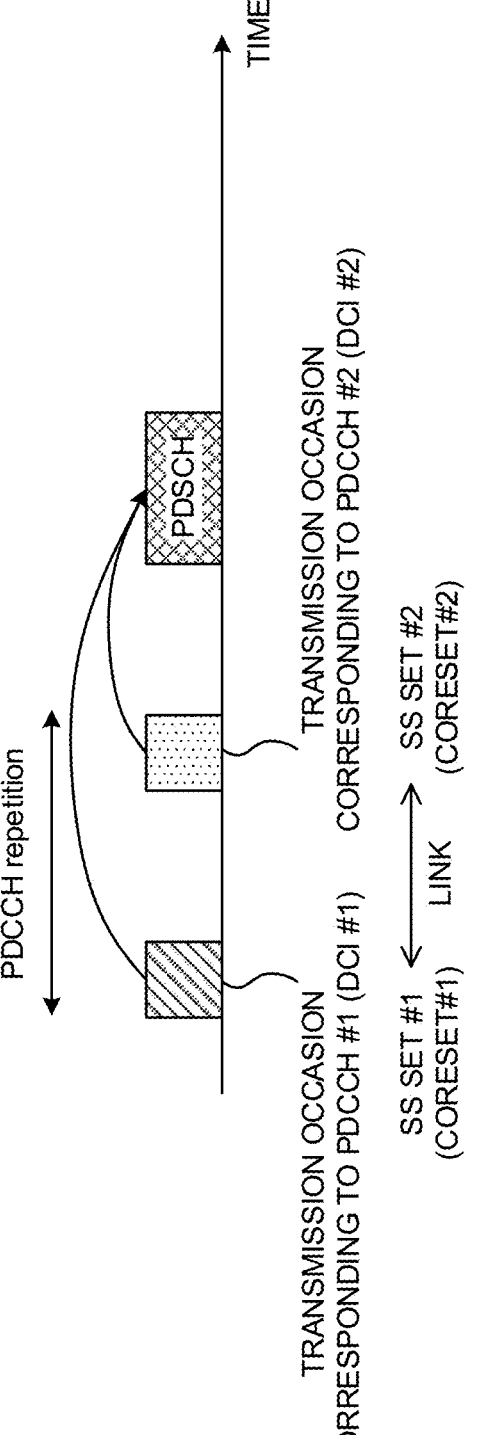
FIG. 7 is a diagram to show an example of PDCCH repetition control.

Assume a case where, for PDCCH repetition (or when PDCCH repetition is applied/configured), a plurality of (for example, two) associated/linked search space sets (SS sets) are supported (refer to FIG. 7). FIG. 7 shows a case where a first search space set (SS set #1) corresponding to first PDCCH #1 and a second search space set (SS set #2) corresponding to second PDCCH #2 are linked.

In this case, a plurality of linked search space sets/plurality of linked CORESETs may be configured based on at least one of Alt. 1-1 and Alt. 1-2 below.

{Alt. 1-1}

Figure 8:
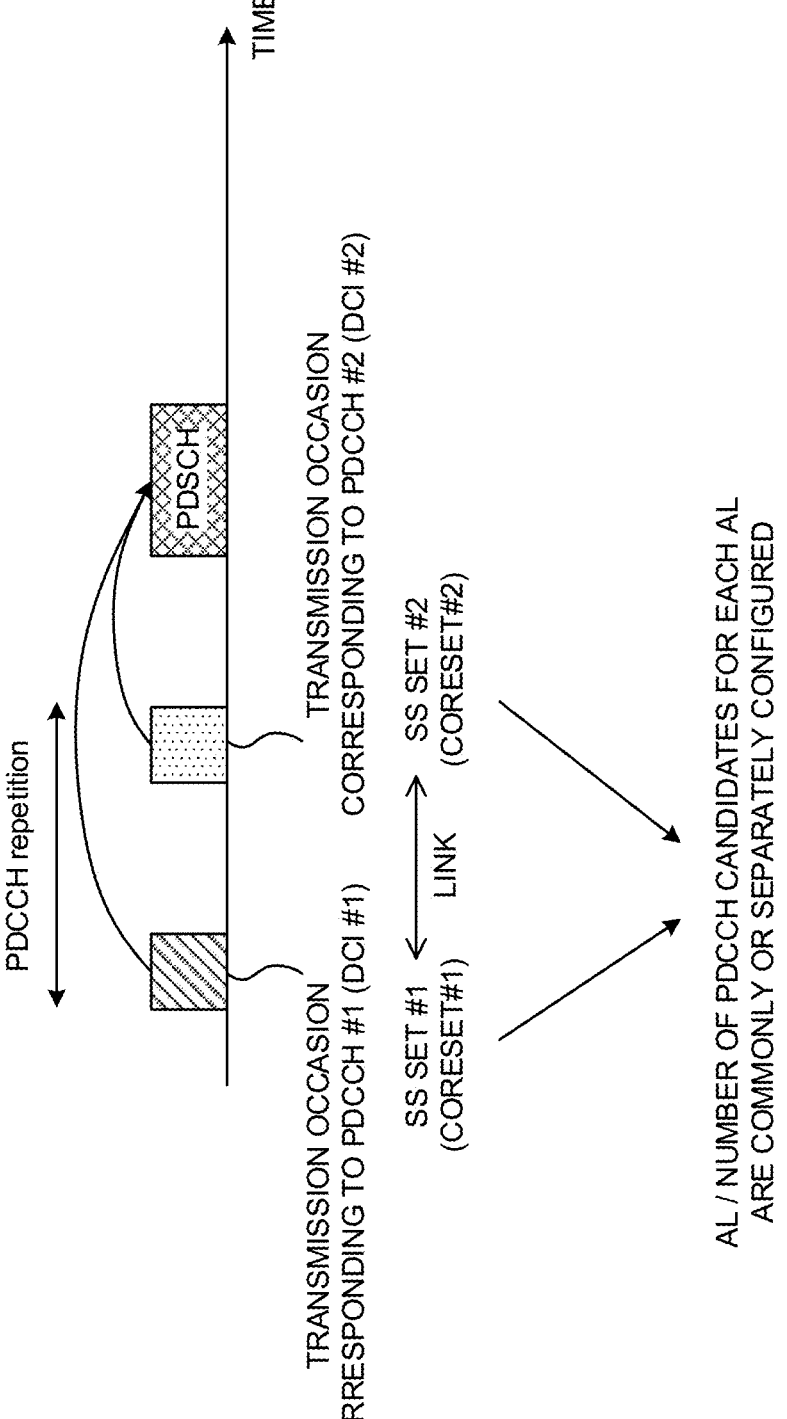
FIG. 8 is a diagram to show an example of PDCCH repetition control in a first aspect.

For a certain DCI format (for example, DCI format 2_0/2_4/2_5), the same aggregation levels may be configured for two linked search space sets (refer to FIG. 8). The same number of PDCCH candidates may be configured for each aggregation level for the two linked search space sets. The search space set may be interpreted as a CORESET.

In other words, when PDCCH repetition is applied/configured, aggregation levels/the number of PDCCH candidates for each aggregation level may be commonly configured for a plurality of search spaces.

The UE need not assume that different aggregation levels are configured for the two search space sets (for example, linked SS sets) configured for PDCCH repetition. Alternatively, the UE need not assume that the number of PDCCH candidates corresponding to each aggregation level is different for the two search space sets (for example, linked SS sets) configured for PDCCH repetition.

When two search space sets (search space IDs) are configured by a higher layer parameter, aggregation levels/the number of PDCCH candidates for each aggregation level corresponding to the respective search space IDs may be configured at the same value.

When PDCCH repetition transmission is applied in this way, by commonly configuring search spaces/the number of PDCCH candidates corresponding to respective PDCCHs, it is possible to suppress an increase of overhead of a higher layer parameter and also reduce monitoring processing load of the UE.

{Alt. 1-2}

For a certain DCI format (for example, DCI format 2_0/2_4/2_5), the same aggregation levels or different aggregation levels may be configured for two linked search space sets. The same number of PDCCH candidates or different numbers of PDCCH candidates may be configured for each aggregation level for the two linked search space sets. The search space set may be interpreted as a CORESET.

In other words, when PDCCH repetition is applied/configured, aggregation levels/the number of PDCCH candidates for each aggregation level may be separately configured for a plurality of search space sets.

When two search space sets (search space IDs) are configured by a higher layer parameter, aggregation levels/the number of PDCCH candidates for each aggregation level corresponding to the respective search space IDs may be configured separately (for example, at the different values).

When the number of PDCCH candidates is different for each search space set, X PDCCH candidates may correspond to a first search space set while Y candidates may correspond to a second search space set (X≠Y), for example. When X<Y, the X PDCCH candidates corresponding to the first search space set may be included in the Y PDCCH candidates corresponding to the second search space set. In this case, the X PDCCH candidates corresponding to the first search space set may have a one-to-one link with the first X PDCCH candidates corresponding to the second search space set.

When PDCCH repetition transmission is applied in this way, by allowing search spaces/the numbers of PDCCH candidates corresponding to respective PDCCHs to be separately configured, it is possible to control PDCCH repetition flexibly.

<Second Aspect>

In the second aspect, a case where which PDCCH is to serve as a reference/basis among a plurality of PDCCHs is determined based on a certain condition when PDCCH repetition is applied/configured will be described.

When PDCCH repetition is applied/configured, a plurality of associated/linked CORESETs/plurality of associated/linked PDCCH candidates/plurality of associated/linked search spaces/plurality of associated/linked search space sets may be configured. In this case, which CORESET/PDCCH candidate/search space/search space set is to serve as a reference/basis among the plurality of linked CORESETs/plurality of linked PDCCH candidates/plurality of linked search spaces/plurality of linked search space sets may be determined based on a certain rule.

Figure 9:
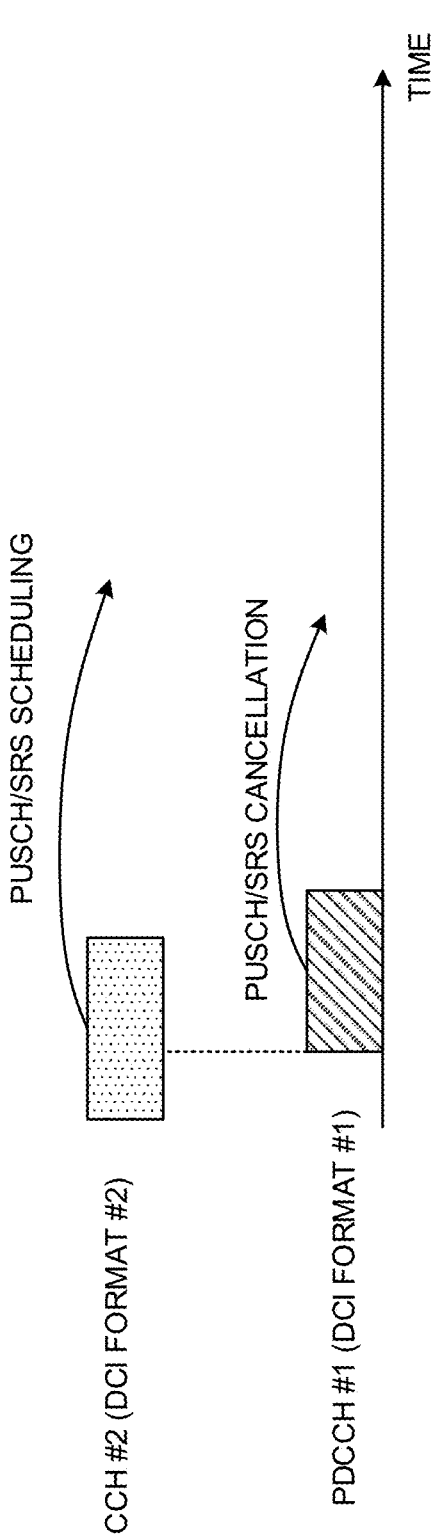
FIG. 9 is a diagram to show an example of transmission timing of a PDCCH indicating cancellation of PUSCH/SRS transmission and a PDCCH scheduling PUSCH/SRS transmission.

DCI format 2_4 (for example, a first DCI format) is used for notification of a PRB(s) and an OFDM symbol(s) for which the UE cancels corresponding UL transmission. When the UE cancels PUSCH transmission/SRS transmission, based on indication of DCI format 2_4, the UE does not assume/expect that the PUSCH transmission/SRS transmission is scheduled by the second DCI format in a symbol including the symbol of the canceled PUSCH transmission/SRS transmission. Here, the last symbol of second PDCCH reception providing a second DCI format (or used for transmission of the second DCI format) is arranged after (or later than) the first symbol of first PDCCH reception providing DCI format 2_4 (refer to FIG. 9).

The second DCI format may be DCI format (for example, DCI format 0_0/0_1/0_2) scheduling the PUSCH transmission/SRS transmission.

When repetition transmission is applied to/configured for/supported for at least one of the first PDCCH used for transmission of DCI format 2_4 and the second PDCCH, a problem is which PDCCH (or PDCCH candidate) among the plurality of PDCCHs (or the plurality of linked PDCCH candidates) is used as a reference/basis.

In this case, based on at least one of whether repetition transmission for the first PDCCH is applied/configured and whether repetition transmission for the second PDCCH is applied/configured, a PDCCH to be referred to/PDCCH to be a reference may be determined.

Figure 10:
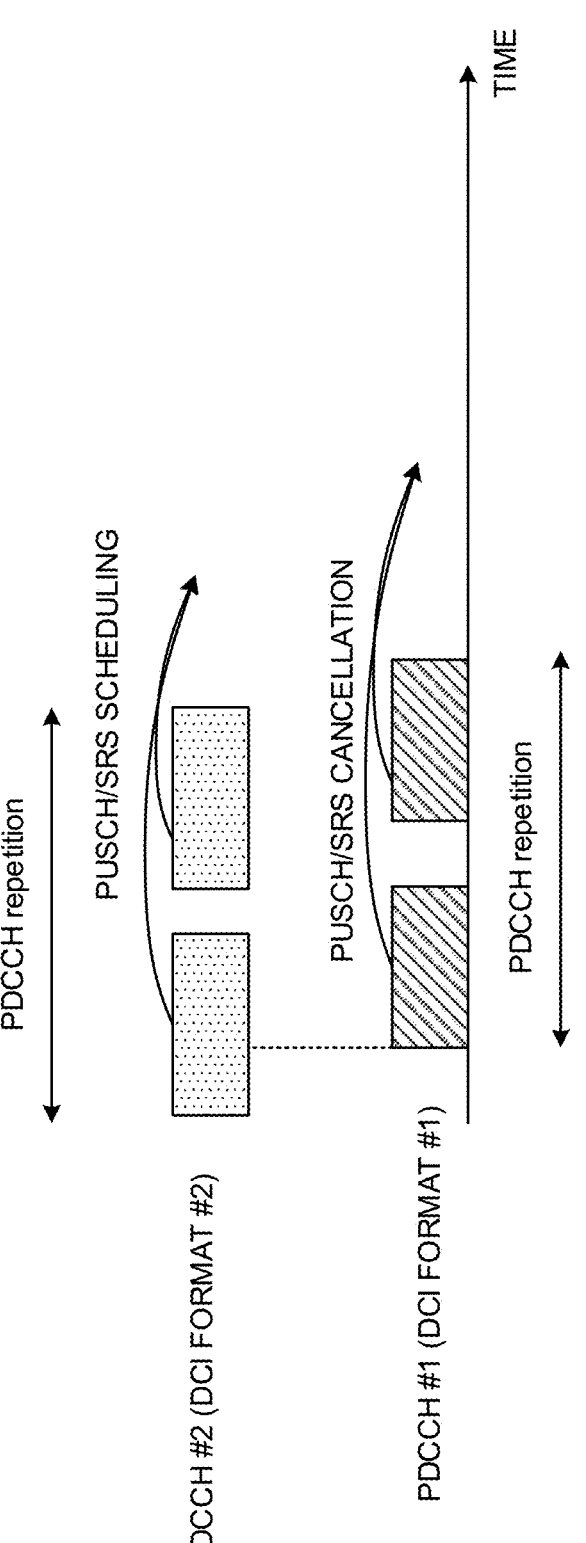
FIG. 10 is a diagram to show an example of PDCCH repetition control in a second aspect.

When repetition transmission is applied to/configured for second PDCCH #2 providing second DCI format #2 (refer to FIG. 10), the second PDCCH (or PDCCH candidate) to serve as a reference may be determined from among a plurality of PDCCHs (or a plurality of linked PDCCH candidates), based on a certain rule below (for example, at least one of Alt. 2-1-1 to Alt. 2-1-5). Note that a PDCCH may be interpreted as a PDCCH candidate.

Alt. 2-1-1: a PDCCH that ends latest in terms of time among a plurality of (for example, two) PDCCHs linked in the time domain.

Alt. 2-1-2: a PDCCH that ends earliest in terms of time among a plurality of (for example, two) PDCCHs linked in the time domain.

Alt. 2-1-3: a PDCCH that starts latest in terms of time among a plurality of (for example, two) PDCCHs linked in the time domain.

Alt. 2-1-4: a PDCCH that starts earliest in terms of time among a plurality of (for example, two) PDCCHs linked in the time domain.

Alt. 2-1-5: a PDCCH with a relatively high (or low) search space set ID/CORESET pool ID/TCI state ID.

When repetition transmission is applied to/configured for first PDCCH #1 providing first DCI format #1 (for example, DCI format 2_4) (refer to FIG. 10), the second PDCCH (or PDCCH candidate) to serve as a reference may be determined from among a plurality of PDCCHs (or a plurality of linked PDCCH candidates), based on a certain rule below (for example, at least one of Alt. 2-2-1 to Alt. 2-2-5). Note that a PDCCH may be interpreted as a PDCCH candidate.

Alt. 2-2-1: a PDCCH that ends latest in terms of time among a plurality of (for example, two) PDCCHs linked in the time domain.

Alt. 2-2-2: a PDCCH that ends earliest in terms of time among a plurality of (for example, two) PDCCHs linked in the time domain.

Alt. 2-2-3: a PDCCH that starts latest in terms of time among a plurality of (for example, two) PDCCHs linked in the time domain.

Alt. 2-2-4: a PDCCH that starts earliest in terms of time among a plurality of (for example, two) PDCCHs linked in the time domain.

Alt. 2-2-5: a PDCCH with a relatively high (or low) search space set ID/CORESET pool ID/TCI state ID.

A configuration that repetition transmission is applied only to one of the first PDCCH and the second PDCCH or is applied to both the first PDCCH and the second PDCCH may be supported.

A certain rule used for determination of a reference PDCCH when repetition transmission is applied to the first PDCCH and a certain rule used for determination of a reference PDCCH when repetition transmission is applied to the second PDCCH may be the same or may be different from each other.

For example, a case where PDCCH repetition is configured for both the first PDCCH and the second PDCCH and Alt. 2-1-1 and Alt. 2-2-4 (different certain rules) are applied is assumed.

In this case, when the UE cancels PUSCH transmission/SRS transmission, based on indication of the first DCI format (for example, DCI format 2_4), the UE may not assume/expect that the PUSCH transmission/SRS transmission is scheduled by the second DCI format in a symbol including the symbol of the canceled PUSCH transmission/SRS transmission. Here the last symbol of the PDCCH candidate ending last in terms of time among two linked PDCCH candidates in the time domain for the second PDCCH reception providing the second DCI format is arranged after (or later than) the first symbol of the PDCCH candidate starting first in terms of time among the two linked PDCCH candidates in the time domain for the first PDCCH reception providing DCI format 2_4.

As described above, based on at least one of whether repetition transmission for the first PDCCH is applied/configured and repetition transmission for the second PDCCH is applied/configured, a PDCCH (or a PDCCH candidate) to serve as a reference is determined. When PDCCH repetition transmission is applied/configured, a PDCCH (or a PDCCH candidate) to serve as a reference is determined based on a certain rule. With this, even when repetition transmission is applied to a PDCCH, reception of the PDCCH (or monitoring of a PDCCH candidate/detection of DCI) can be appropriately controlled.

<Third Aspect>

In the third aspect, a control method when PDCCH repetition is supported in a random access procedure (for example, four-step/two-step random access procedure) will be described.

When the UE transmits a PRACH in the four-step random access procedure, the UE operates to detect, in response to the PRACH transmission, DCI format (for example, DCI format 1_0) CRC-scrambled with an RA-RNTI during a certain window/certain duration. The certain window/certain duration may be configured/notified by higher layer signaling.

Figure 11:
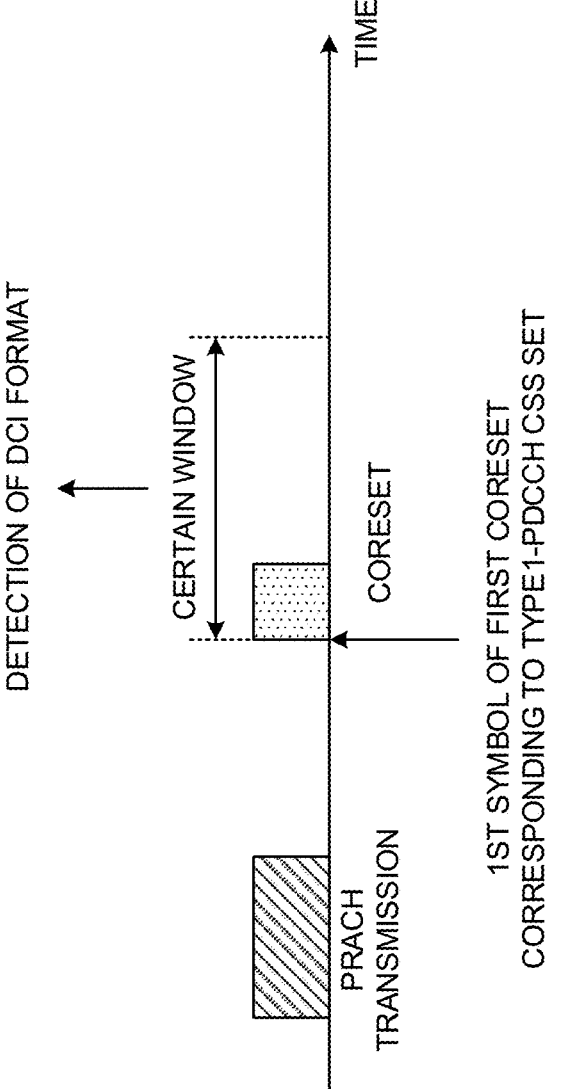
FIG. 11 is a diagram to show an example of a case of performing detection of DCI in response to PRACH transmission.

The certain window starts, after the last symbol of the PRACH occasion corresponding to the PRACH transmission, from the first symbol of the earliest CORESET (at least one symbol) configured to receive a PDCCH of a Type1-PDCCH CSS set (refer to FIG. 11).

Alternatively, when the UE transmits a PRACH/PUSCH (message A) in the two-step random access procedure, the UE operates to detect, in response to the PRACH/PUSCH transmission (or in response only to the PRACH transmission when a PRACH preamble is mapped to a valid PUSCH occasion), DCI format (for example, DCI format 1_0) CRC-scrambled with an MsgB-RNTI during a certain window/certain duration. The certain window/certain duration may be configured/notified by higher layer signaling.

The certain window starts, after the last symbol of the PUSCH occasion corresponding to the PRACH transmission, from the first symbol of the earliest CORESET (at least one symbol) configured to receive a PDCCH of a Type1-PDCCH CSS set.

Alternatively, when the UE transmits a PRACH (message A) in the two-step random access procedure and a PRACH preamble is not mapped to a valid PUSCH occasion, the UE operates to detect, in response to the PRACH transmission, DCI format (for example, DCI format 1_0) CRC-scrambled with an MsgB-RNTI during a certain window/certain duration. The certain window/certain duration may be configured/notified by higher layer signaling.

The certain window starts, after the last symbol of the PRACH occasion corresponding to the PRACH transmission, from the first symbol of the earliest CORESET (at least one symbol) configured to receive a PDCCH of a Type1-PDCCH CSS set.

When PDCCH repetition transmission is applied to/configured for/supported for a Type1-PDCCH, a problem is which PDCCH (or PDCCH candidate/CORESET) among the plurality of PDCCHs (or the plurality of linked PDCCH candidates/CORESETs) is to be used as a reference/basis.

In this case, based on whether PDCCH repetition transmission for the Type1-PDCCH is applied/configured, a PDCCH to be referred to/PDCCH to be a reference may be determined.

Figure 12:
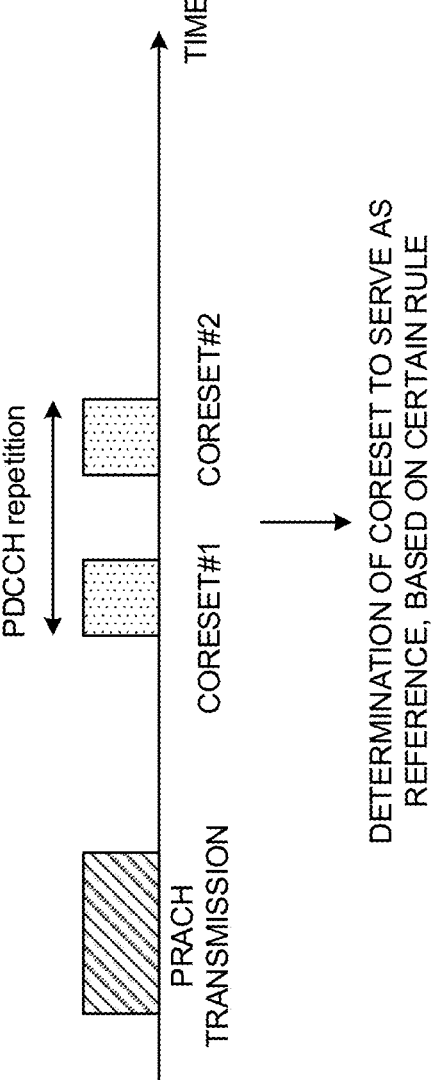
FIG. 12 is a diagram to show an example of PDCCH repetition control in a third aspect.

A case where repetition transmission is applied to/configured for a PDCCH (for example, a PDCCH for Type-1-PDCCH common search space set) providing a DCI format attempting detection according to PRACH transmission is assumed (refer to FIG. 12). In this case, the PDCCH (or CORESET/PDCCH candidate) to serve as a reference may be determined based on a certain rule below (for example, at least one of Alt. 3-1 to Alt. 3-5).

Alt. 3-1: a CORESET/PDCCH candidate that ends latest in terms of time among a plurality of (for example, two) CORESETs/PDCCH candidates linked in the time domain.

Alt. 3-2: a CORESET/PDCCH candidate that ends earliest in terms of time among a plurality of (for example, two) CORESETs/PDCCH candidates linked in the time domain.

Alt. 3-3: a CORESET/PDCCH candidate that starts latest in terms of time among a plurality of (for example, two) CORESETs/PDCCH candidates linked in the time domain.

Alt. 3-4: a CORESET/PDCCH candidate that starts earliest in terms of time among a plurality of (for example, two) CORESETs/PDCCH candidates linked in the time domain.

Alt. 3-5: a CORESET/PDCCH candidate with a relatively high (or low) search space set ID/CORESET ID/CORESET pool ID/TCI state ID.

For example, a case where PDCCH repetition is configured for a PDCCH of a Type1-PDCCH common search space set and Alt. 3-3 is applied is assumed.

In this case, when the UE transmits a PRACH in the four-step random access procedure, the UE operates to detect, in response to the PRACH transmission, DCI format (for example, DCI format 1_0) CRC-scrambled with an RA-RNTI during a certain window/certain duration. The certain window/certain duration may be configured/notified by higher layer signaling.

Figure 13:
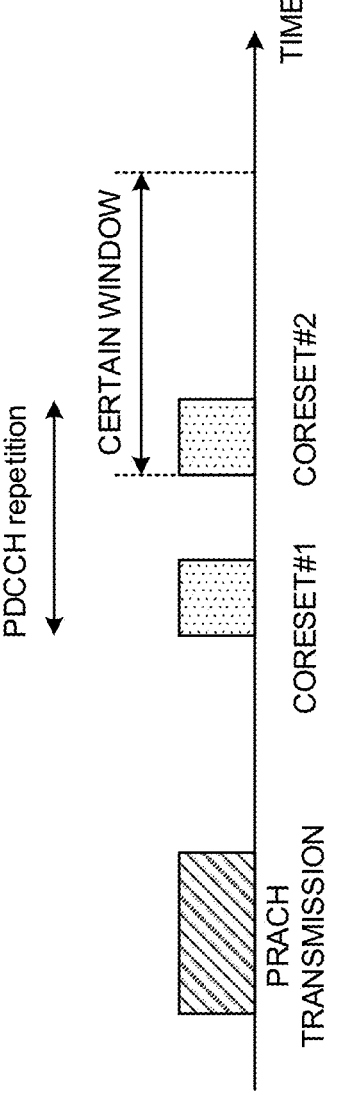
FIG. 13 is a diagram to show another example of the PDCCH repetition control in the third aspect.

The certain window starts, after the last symbol of the PRACH occasion corresponding to the PRACH transmission, from the first symbol of the earliest CORESET (at least one symbol) configured to receive a PDCCH of a Type1-PDCCH CSS set. When the earliest CORESET is linked to another CORESET for repetition transmission, the certain window may start from the first symbol of the CORESET starting later in terms of time (here, CORESET #2) between the two linked CORESETs (refer to FIG. 13).

As described above, based on whether repetition transmission for the PDCCH of a Type1-PDCCH CSS set is applied/configured, a PDCCH (or a CORESET) to serve as a reference is determined. When PDCCH repetition transmission is applied/configured, a PDCCH (or a CORESET) to serve as a reference is determined based on a certain rule. With this, even when repetition transmission is applied to a PDCCH, reception of the PDCCH (or monitoring of a PDCCH candidate/detection of DCI) can be appropriately controlled.

The third aspect may be applied to a case where PDCCH repetition transmission (or a plurality of linked PDCCH candidates/plurality of linked CORESETs) are applied/configured. For example, the UE may perform control to apply the third aspect, based on a configuration/indication of RRC/MAC CE/DCI. Alternatively, the UE may apply the third aspect when a plurality of (for example, two) CORESETs/search space sets are configured for a PDCCH of a Type1-PDCCH common search space and are linked for PDCCH repetition.

Alternatively, the UE may apply the third aspect when it is configured/notified that a CORESET/search space set configured for a PDCCH of a Type1-PDCCH common search space is linked to/associated with another CORESET/search space set.

<Fourth Aspect>

In the fourth aspect, a control method when PDCCH repetition is supported in a random access procedure (for example, non-contention-based four-step/two-step random access procedure) using a PDCCH order will be described.

When PRACH transmission is triggered by a PDCCH order, the UE performs PRACH transmission and attempts detection of a DCI format in response to the PRACH transmission. Specifically, in response to a PRACH transmission initiated by a PDCCH order triggering a non-contention-based random access procedure for an SpCell, the UE operates to detect a DCI format (for example, DCI format 1_0) CRC-scrambled with an RA-RNTI.

Figure 14:
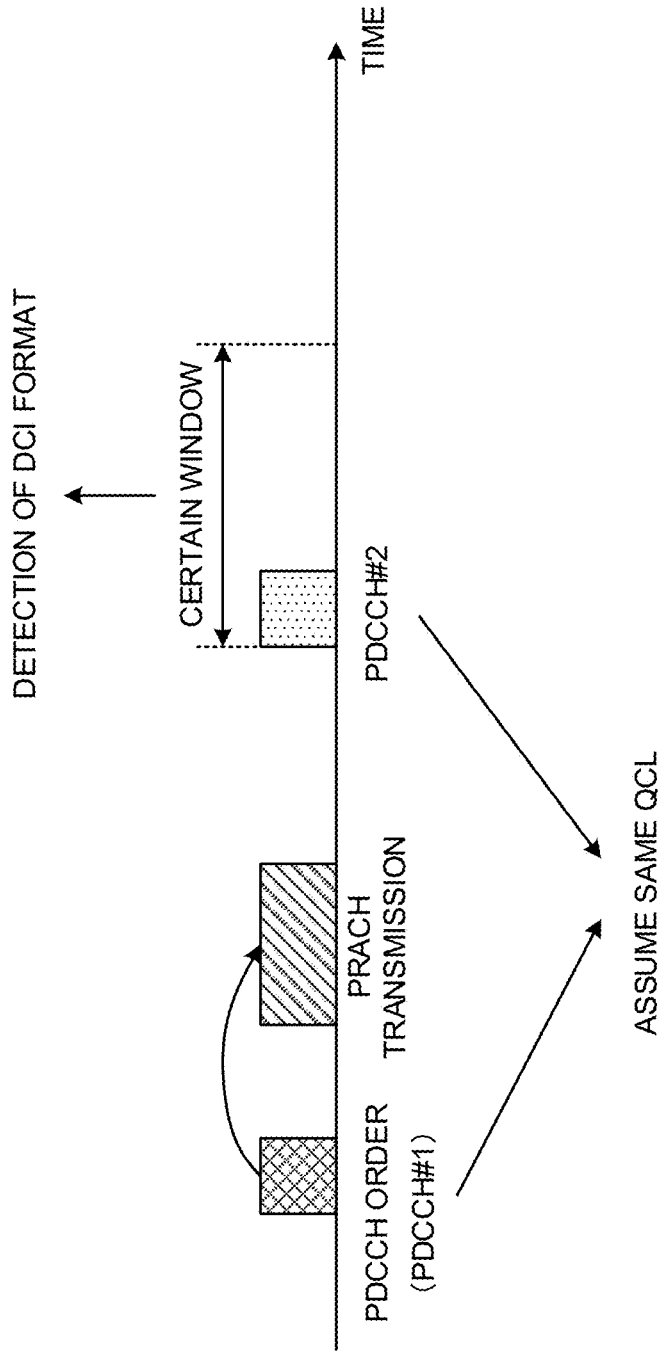
FIG. 14 is a diagram to show an example of QCL assumption in a case of performing detection of DCI in response to PRACH transmission.

In this case, the UE may assume that a PDCCH (for example, the second PDCCH) including the DCI format and the PDCCH order (for example, the first PDCCH) have the same quasi-co-location characteristics (for example, DMRS antenna port quasi-co-location characteristics) (refer to FIG. 14).

For example, when the UE detects a DCI format in response to PRACH transmission, the UE may assume that the second PDCCH used for transmission of the DCI format and the PDCCH order (first PDCCH) are QCLed, to perform reception processing.

When repetition transmission is applied to/configured for/supported for at least one of the PDCCH order (for example, the first PDCCH) and the second PDCCH, a problem is which PDCCH (or PDCCH candidate/CORESET) among a plurality of PDCCHs (or a plurality of linked PDCCH candidates/plurality of linked CORESETs) is to be used as a reference/basis to judge QCL.

Figure 15:
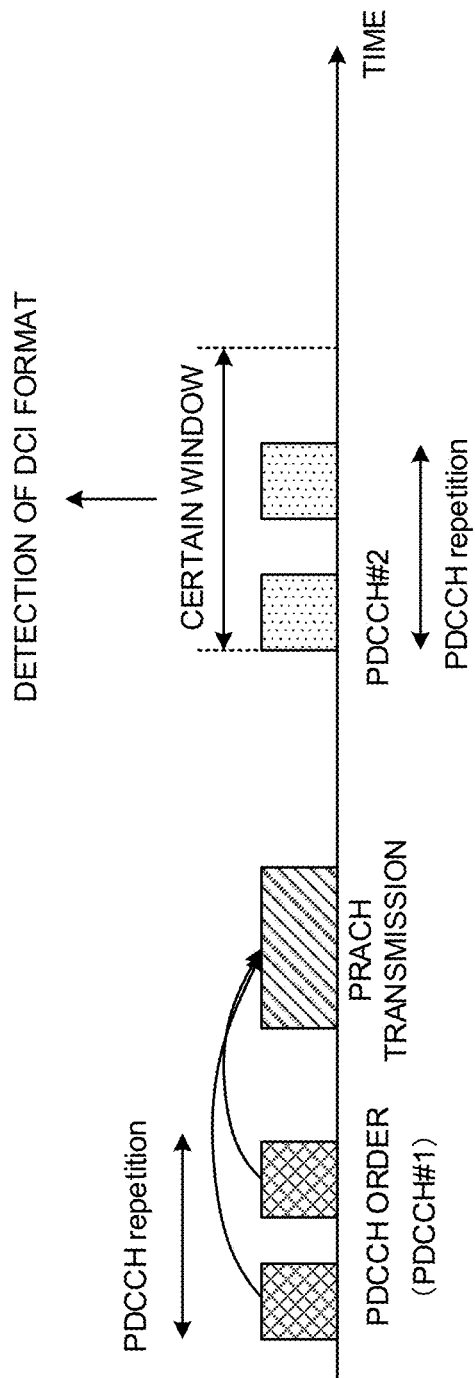
FIG. 15 is a diagram to show an example of PDCCH repetition control in a fourth aspect.

In this case, based on at least one of whether repetition transmission for the first PDCCH is applied/configured and whether repetition transmission for the second PDCCH is applied/configured, a PDCCH to be referred to in judging QCL may be determined (refer to FIG. 15).

<<Case where Repetition Transmission is Applied to/Configured for Both PDCCHs>>

A case where repetition transmission is applied to both a PDCCH order (first PDCCH) and a second PDCCH providing a DCI format attempting detection in response to PRACH transmission is assumed. In this case, at least one of Alt. 4-1-0 to Alt. 4-1-2 below may be applied.

{Alt. 4-1-0}

It may be configured that repetition transmission is applied to/configured for neither the first PDCCH nor the second PDCCH. The UE may not assume a case where repetition transmission is applied to/configured for both the first PDCCH and the second PDCCH.

For example, the UE may not assume that PDCCH repetition transmission is applied to a PDCCH (the second PDCCH) including DCI format 1_0. Alternatively, the UE may not assume that PDCCH repetition transmission is applied to the PDCCH order (first PDCCH).

{Alt. 4-1-1}

The UE may assume that a plurality of (for example, two) linked PDCCH candidates/CORESETs corresponding to the second PDCCH and a plurality of (for example, two) linked PDCCH candidates/CORESETs corresponding to the PDCCH order (first PDCCH) have the same DMRS antenna port quasi-co-location characteristics.

Figure 16:
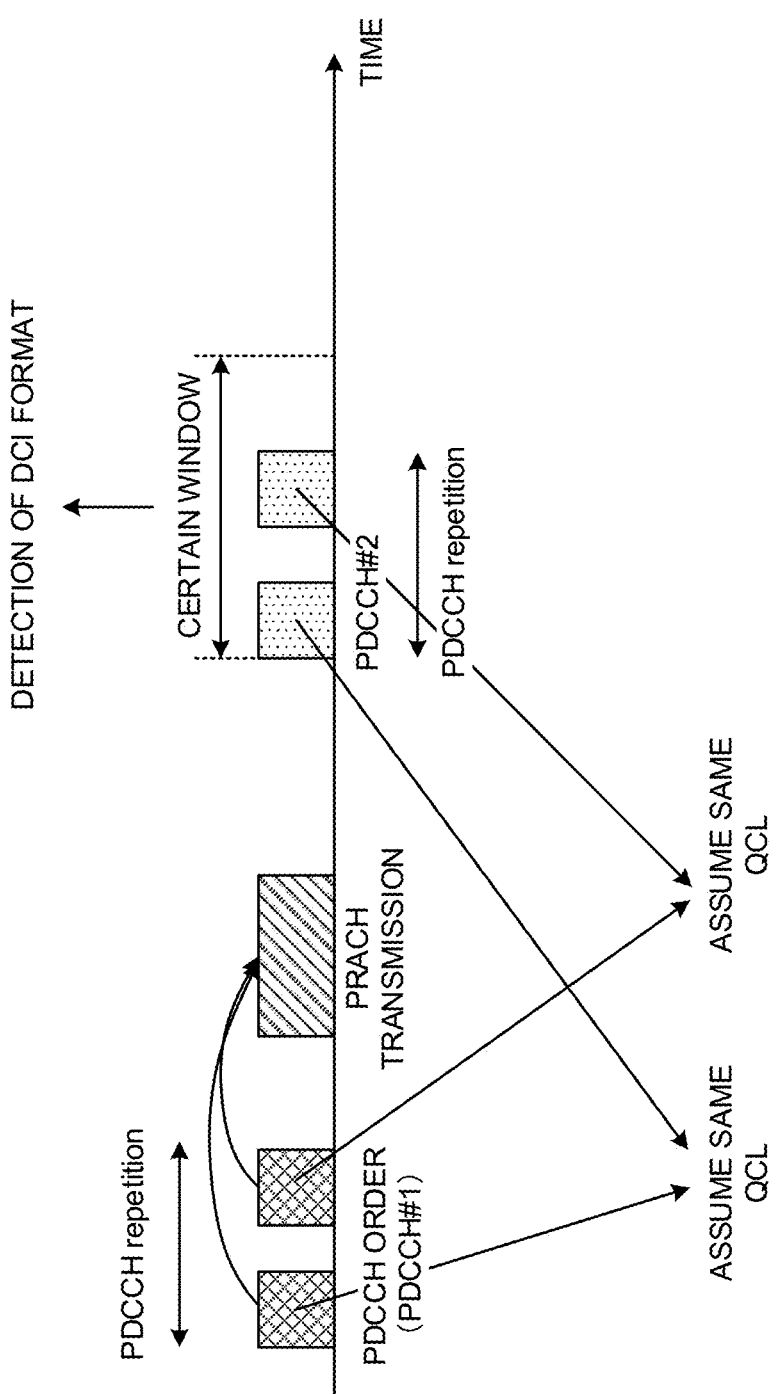
FIG. 16 is a diagram to show another example of the PDCCH repetition control in the fourth aspect.

For example, among the linked PDCCH candidates/CORESETs corresponding to second PDCCH #2, the PDCCH candidate/CORESET starting/ending earlier (or later) in terms of time may have the same QCL as that of the PDCCH candidate/CORESET starting/ending earlier (or later) in terms of time among the linked PDCCH candidates/CORESETs corresponding to the PDCCH order (refer to FIG. 16).

Alternatively, among the linked PDCCH candidates/CORESETs corresponding to the second PDCCH, the CORESET/PDCCH candidate with a relatively high (or low) search space set ID/CORESET ID/CORESET pool ID may have the same QCL as that of the PDCCH candidate/CORESET with a relatively high (or low) search space set ID/CORESET ID/CORESET pool ID among the linked PDCCH candidates/CORESETs corresponding to the PDCCH order.

{Alt. 4-1-2}

The UE may assume that one of a plurality of (for example, two) linked PDCCH candidates/CORESETs corresponding to the second PDCCH and one of a plurality of (for example, two) linked PDCCH candidates/CORESETs corresponding to the PDCCH order (first PDCCH) have the same DMRS antenna port quasi-co-location characteristics.

One of the plurality of linked PDCCH candidates/CORESETs may be determined with application of the certain rule described in the third aspect. For example, a PDCCH candidate/CORESET to be used as a reference/basis determined based on at least one of Alt. 3-1 to Alt. 3-5 described in the third aspect may be selected as the one PDCCH candidate/CORESET. Note that different certain rules (for example, Alts) may be applied to the first PDCCH (for example, the PDCCH order) and the second PDCCH.

In Alt. 4-1-1/Alt. 4-1-2, a plurality of linked PDCCH candidates/CORESETs corresponding to the first PDCCH (for example, the PDCCH order) may have the same DMRS antenna port quasi-co-location characteristics. A plurality of linked PDCCH candidates/CORESETs corresponding to the second PDCCH may have the same DMRS antenna port quasi-co-location characteristics.

<<Case where Repetition Transmission is Applied to/Configured for First PDCCH>>

A case where repetition transmission is applied to the PDCCH order (first PDCCH) while repetition transmission is not applied to the second PDCCH providing a DCI format attempting detection in response to PRACH transmission is assumed. The second PDCCH may correspond to single transmission. In this case, at least one of Alt. 4-2-0 to Alt. 4-2-2 below may be applied.

{Alt. 4-2-0}

It may be configured that repetition transmission is not applied to/configured for the first PDCCH. The UE may not assume a case where repetition transmission is applied to/configured for the first PDCCH.

{Alt. 4-2-1}

Figure 17:
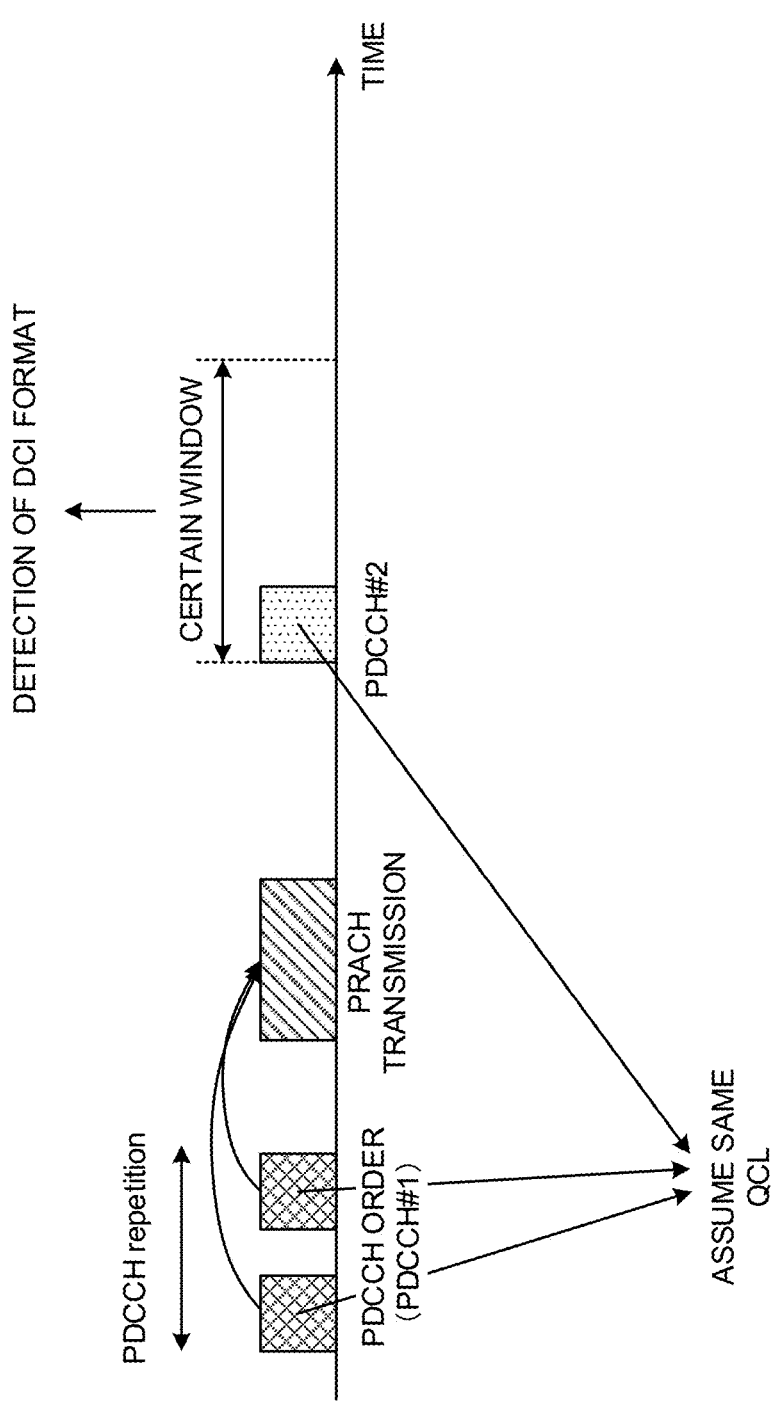
FIG. 17 is a diagram to show another example of the PDCCH repetition control in the fourth aspect.

The UE may assume that the second PDCCH (PDCCH including DCI format 1_0) and a plurality of (for example, two) linked PDCCH candidates/CORESETs corresponding to the PDCCH order have the same DMRS antenna port quasi-co-location characteristics (refer to FIG. 17). In other words, it may be assumed that the second PDCCH corresponding to single transmission is QCLed with the plurality of first PDCCHs (or CORESETs/PDCCH candidates) to which repetition transmission is applied. In this case, it may be meant that the PDCCH repetitions (for example, the plurality of first PDCCHs) have the same QCL relationship.

{Alt. 4-2-2}

The UE may assume that the second PDCCH (PDCCH including DCI format 1_0) and a specific one of the plurality of (for example, two) linked PDCCH candidates/CORESETs corresponding to the PDCCH order have the same DMRS antenna port quasi-co-location characteristics. In other words, it may be assumed that the second PDCCH corresponding to single transmission is QCLed with one of the plurality of first PDCCHs (or CORESETs/PDCCH candidates) to which repetition transmission is applied. In this case, the same QCL relationship may be applied or different QCL relationships may be applied to the PDCCH repetitions (for example, the plurality of first PDCCHs).

The specific one of the plurality of (for example, two) linked PDCCH candidates/CORESETs corresponding to the PDCCH order may be determined with application of the certain rule described in the third aspect. For example, a PDCCH candidate/CORESET to be used as a reference/ basis determined based on at least one of Alt. 3-1 to Alt. 3-5 described in the third aspect may be selected as the one PDCCH candidate/CORESET.

<<Case where Repetition Transmission is Applied to/Configured for Second PDCCH>>

A case where repetition transmission is applied to the second PDCCH providing a DCI format attempting detection in response to PRACH transmission while repetition transmission is not applied to the PDCCH order (first PDCCH) is assumed. The first PDCCH may correspond to single transmission. In this case, at least one of Alt. 4-3-0 to Alt. 4-3-2 below may be applied.

{Alt. 4-3-0}

It may be configured that repetition transmission is not applied to/configured for the second PDCCH. The UE may not assume a case where repetition transmission is applied to/configured for the second PDCCH.

{Alt. 4-3-1}

Figure 18:
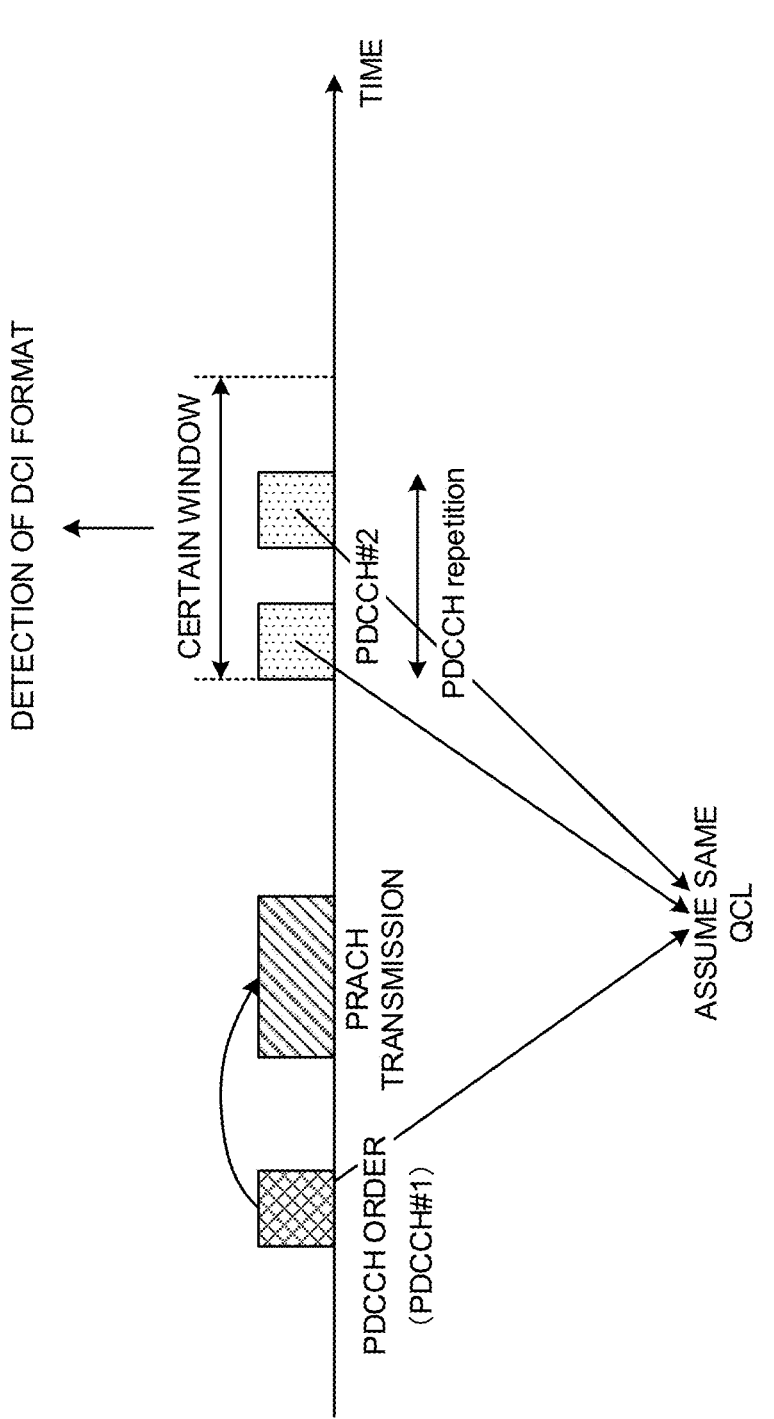
FIG. 18 is a diagram to show another example of the PDCCH repetition control in the fourth aspect.

The UE may assume that a plurality of (for example, two) linked PDCCH candidates/CORESETs corresponding to the second PDCCH (PDCCH including DCI format 1_0) and the PDCCH order have the same DMRS antenna port quasi-co-location characteristics (refer to FIG. 18). In other words, it may be assumed that a plurality of second PDCCHs (or CORESETs/PDCCH candidates) to which repetition transmission is applied is QCLed with the first PDCCH corresponding to single transmission. In this case, it may be meant that the PDCCH repetitions (for example, the plurality of second PDCCHs) have the same QCL relationship.

{Alt. 4-3-2}

The UE may assume that a specific one of a plurality of (for example, two) linked PDCCH candidates/CORESETs corresponding to the second PDCCH (PDCCH including DCI format 1_0) and the PDCCH order have the same DMRS antenna port quasi-co-location characteristics. In other words, it may be assumed that one of the plurality of second PDCCHs (or CORESETs/PDCCH candidates) to which repetition transmission is applied is QCLed with the second PDCCH corresponding to single transmission. In this case, the same QCL relationship may be applied or different QCL relationships may be applied to the PDCCH repetitions (for example, the plurality of second PDCCHs).

The specific one of the plurality of (for example, two) linked PDCCH candidates/CORESETs corresponding to the second PDCCH may be determined with application of the certain rule described in the third aspect. For example, a PDCCH candidate/CORESET to be used as a reference/ basis determined based on at least one of Alt. 3-1 to Alt. 3-5 described in the third aspect may be selected as the one PDCCH candidate/CORESET.

UE capability (for example, UE capability) about the second PDCCH including DCI format 1_0/the first PDCCH being a PDCCH order corresponds to PDCCH repetition may be defined for each of the above-described cases.

<Fifth Aspect>

In the fifth aspect, a method of configuring a plurality of linked search space sets corresponding to respective PDCCHs to which repetition transmission is applied (or configured for PDCCH repetition) will be described. The fifth aspect may be applied to a common search space (for example, a Type0/0A/1/2 PDCCH-CSS), for example.

When repetition transmission for a PDCCH is applied/ configured/supported, a plurality of (for example, two)

linked search space sets may be configured. The plurality of linked search space sets may have the same search space set type (for example, UE-specific SS search space (USS)/ common search space (CSS)). The plurality of linked search space sets may correspond to the same DCI format.

When PDCCH repetition transmission is performed in a slot (for example, intra-slot PDCCH repetition), the plurality of search space sets may have the same periodicity (for example, periodicity), the same offset (for example, offset), or the same duration (for example, duration). The periodicity and the offset may be configured by a higher layer parameter (for example, monitoringSlotPeriodicityAndOffset).

A plurality of PDCCH candidates may be linked for configuration in the plurality of search space sets. The same number of PDCCH candidates may be configured for each aggregation level for the number linked search space sets.

In an existing system (for example, Rel. 16 or previous versions), a search space set corresponding to Type0-PDCCH (for example, a PDCCH scheduling a PDSCH including SIB1) is configured by a first higher layer parameter (for example, SearchSpaceZero). A CORESET corresponding to the Type0-PDCCH (for example, the CORESET for PDCCH scheduling a PDSCH including SIB1) is configured by a second higher layer parameter (for example, ControlResourceSetZero).

The UE judges the CORESET corresponding to Type0-PDCCH search space set, based on an association between an index which may be indicated by the second higher layer parameter (entry candidate) and a set of a resource block and a symbol of a CORESET or the like (for example, a table in FIG. 19A).

The UE judges a parameter for a PDCCH monitoring occasion corresponding to the Type0-PDCCH search space set, based on an association between an index which may be indicated by the first higher layer parameter (entry candidate) and the number of search spaces per slot and a start symbol index or the like (for example, a table in FIG. 19B).

A problem is whether it is possible to associate/link the first higher layer parameter (for example, SearchSpaceZero) with/to another search space set for configuration or how to perform control when these are associated/linked for configuration. Alternatively, a problem is whether it is possible to associate/link the second higher layer parameter (for example, ControlResourceSetZero) with/to another CORE-SET for configuration or how to perform control when these are associated/linked for configuration.

In an existing system (for example, Rel. 15/16), a search space set of common search spaces is configured by a higher layer parameter indicating a search space ID.

It is supported that the search space set corresponding to a Type0-PDCCH is configured by a higher layer parameter (for example, searchSpaceSIB1) indicating a search space ID (for example, SearchSpaceID).

It is supported that the search space set corresponding to a Type0A-PDCCH is configured by a higher layer parameter (for example, searchSpaceOtherSystemInformation) indicating a search space ID.

It is supported that the search space set corresponding to a Type1-PDCCH is configured by a higher layer parameter (for example, ra-SearchSpace) indicating a search space ID.

It is supported that the search space set corresponding to a Type2-PDCCH is configured by a higher layer parameter (for example, pagingSearchSpace) indicating a search space ID.

In this way, the UE can refer to the search space set configured by a certain higher layer parameter (searchSpaceSIB1/searchSpaceOtherSystemInformation/ra- SearchSpace/pagingSearchSpace), to judge for a search space set configured for a Type0/0A/1/2-PDCCH.

A problem is whether it is possible to associate/link a search space set configured for a Type0/0A/1/2-PDCCH with/to another search space set or how to perform control when these are associated/linked for configuration.

<<SearchSpaceZero>>

When a search space set is configured for a first higher layer parameter (for example, SearchSpaceZero), at least one of Alt. 5-1-1 and Alt. 5-1-2 below may be applied.

{Alt. 5-1-1}

The first higher layer parameter (for example, SearchSpaceZero) may be configured to be linked to another search space set configured by RRC/MAC CE.

For SearchSpaceZero, a plurality of (for example, two) search space sets configured/determined by option 5-1-1A to 5-1-1C below may be linked for PDCCH repetition.

{{Option 5-1-1A}}

A plurality of (for example, two) values may be configured/notified by a higher layer parameter (for example, SearchSpaceZero), and the values may correspond to the respective linked search space sets (refer to FIG. 20A). Each of the values may indicate an index from associations (for example, a table) defined in advance and corresponding to a parameter set of PDCCH monitoring occasion.

Certain associations (for example, a table) may be a table obtained by reusing associations defined in an existing system (Rel. 15/Rel. 16) (for example, the table in FIG. 19B) and adding a new entry(ies). Alternatively, the certain associations (for example, the table) may be obtained by defining new associations (for example, a table) including similar parameters to those for associations defined in an existing system (Rel. 15/Rel. 16) (for example, the table in FIG. 19B).

Alternatively, one search space set may be configured by using the first higher layer parameter (for example, SearchSpaceZero), and another search space set may be configured by using another higher layer parameter (for example, SearchSpaceZero-link) (refer to FIG. 20B).

{{Option 5-1-1B}}

One value may be configured/notified by a higher layer parameter (for example, SearchSpaceZero), and the value may indicate an index from associations (for example, a table) defined in advance and corresponding to a plurality of (for example, two) parameter sets of PDCCH monitoring occasion (refer to FIG. 20C). In other words, a plurality of search space sets may be determined by one index configured/notified by a higher layer parameter and certain associations.

The certain associations (for example, the table) may be obtained by defining new associations (for example, a table) including similar parameters to those for associations defined in an existing system (Rel. 15/Rel. 16) (for example, the table in FIG. 19B).

{{Option 5-1-1C}}

One value may be configured/notified by a higher layer parameter (for example, SearchSpaceZero), and the value may indicate an index from associations (for example, a table) defined in advance and corresponding to a parameter set of a PDCCH monitoring occasion corresponding to one search space set. Another search space set linked to one search space set obtained by the higher layer parameter and certain associations (or a parameter of a PDCCH monitoring occasion of another search space set) may be determined based on a certain rule (refer to FIG. 20D).

The certain associations (for example, a table) may use associations defined in an existing system (Rel. 15/Rel. 16) (for example, the table in FIG. 19B).

The certain rule may be, for example, that the monitoring occasion of another search space set is determined according to at least one of a slot/symbol offset of a search space set configured by a higher layer parameter and the PDCCH monitoring occasion.

{Alt. 5-1-2}

Alternatively, the first higher layer parameter (for example, SearchSpaceZero) may be configured not to be linked to another search space set for configuration. The UE may not assume that SearchSpaceZero is configured to be linked to another search space set.

<<ControlResourceSetZero>>

When one or more CORESETs (for example, linked CORESETs) are configured for the second higher layer parameter (for example, ControlResourceSetZero), at least one of Alt. 5-2-1 and Alt. 5-2-2 below may be applied.

{Alt. 5-2-1}

One CORESET may be configured. The one CORESET may be configured as a CORESET used for an existing system. A plurality of (for example, two) linked search space sets determined using SearchSpaceZero described above may be associated with the same CORESET.

{Alt. 5-2-2}

A plurality of (for example, two) CORESETs configured/determined by option 5-2-1A to option 5-2-1C below may be regarded as being linked to/associated with PDCCH repetition (or a plurality of (for example, two) linked search space sets determined using SearchSpaceZero described above).

{{Option 5-2-1A}}

A plurality of (for example, two) values may be configured/notified by a higher layer parameter (for example, ControlResourceSetZero), and the values may correspond to the respective linked CORESETs (refer to FIG. 21A). Each of the values may indicate an index from associations (for example, a table) defined in advance and corresponding to a parameter set of the CORESETs.

Certain associations (for example, a table) may be a table obtained by reusing associations defined in an existing system (Rel. 15/Rel. 16) (for example, the table in FIG. 19A) and adding a new entry(ies). Alternatively, the certain associations (for example, the table) may be obtained by defining new associations (for example, a table) including similar parameters to those for associations defined in an existing system (Rel. 15/Rel. 16) (for example, the table in FIG. 19A).

Alternatively, one CORESET may be configured by using the second higher layer parameter (for example, ControlResourceSetZero), and another CORESET may be configured by using another higher layer parameter (for example, ControlResourceSetZero-link) (refer to FIG. 21B).

{{Option 5-1-1B}}

One value may be configured/notified by a higher layer parameter (for example, ControlResourceSetZero), and the value may indicate an index from associations (for example, a table) defined in advance and corresponding to a plurality of (for example, two) parameter sets of CORESETs (refer to FIG. 21C). In other words, a plurality of CORESETs may be determined by one index configured/notified by a higher layer parameter and certain associations.

The certain associations (for example, the table) may be obtained by defining new associations (for example, a table) including similar parameters to those for associations defined in an existing system (Rel. 15/Rel. 16) (for example, the table in FIG. 19A).

{{Option 5-1-1C}}

One value may be configured/notified by a higher layer parameter (for example, ControlResourceSetZero), and the value may indicate an index from associations (for example, a table) defined in advance and corresponding to one parameter set of one CORESET. Another CORESET linked to one CORESET obtained by the higher layer parameter and certain associations (or a parameter of another CORESET) may be determined based on a certain rule (refer to FIG. 21D).

The certain associations (for example, a table) may use associations defined in an existing system (Rel. 15/Rel. 16) (for example, the table in FIG. 19A).

The certain rule may be, for example, that the frequency position of another CORESET is determined based on at least one of a resource block (RB) offset and the frequency position of a CORESET configured by a higher layer parameter.

Note that the two CORESETs may be associated with two respective search space sets by a predefined rule. For example, a first CORESET may be associated with a first search space set, and a second CORESET may be associated with a second search space set. Alternatively, the two CORESETs may be associated with two search space sets by an explicit configuration (for example, RRC/MAC CE).

<<Type0/0A/1/2-PDCCH>>

When a search space set is configured for a Type0/0A/1/2-PDCCH, at least one of Alt. 5-3-1 and Alt. 5-3-2 below may be applied.

{Alt. 5-3-1}

It may be configured that a search space set configured for Type0/0A/1/2-PDCCH is linked to another search space set by RRC/MAC CE.

For a Type0/0A/1/2-PDCCH, a plurality of (for example, two) search space sets may be configured by using a certain higher layer parameter. The certain higher layer parameter may be searchSpaceSIB1/searchSpaceOtherSystemInformation/ra-SearchSpace/pagingSearchSpace. In this case, information indicating a plurality of (for example, two) search space IDs may be included in a certain higher layer parameter (refer to FIG. 22).

Alternatively, for a Type0/0A/1/2-PDCCH, a plurality of (for example, two) search space sets may be configured by using a plurality of higher layer parameters. For example, it may be configured that one search space set configured by using a higher layer parameter (searchSpaceSIB1/searchSpaceOtherSystemInformation/ra-SearchSpace/pagingSearchSpace) supported by an existing system and a search space set configured by using another higher layer parameter are linked to each other. Such another higher layer parameter may be, for example, searchSpaceSIB1-link/searchSpaceOtherSystemInformation-link/ra-SearchSpace-link/pagingSearchSpace-link.

The plurality of search space sets may be linked to/associated with PDCCH repetition by using explicit RRC/MAC CE. Alternatively, when a plurality of search space sets are configured, the plurality of search space sets may be regarded as being linked to/associated with PDCCH repetition even without explicit configuration/indication.

{Alt. 5-3-2}

It may be configured that a search space set configured for a Type0/0A/1/2-PDCCH is not linked to another search space set for configuration. The UE may not assume that a search space set configured for a Type0/0A/1/2-PDCCH is linked to another search space set.

(UE Capability Information)

The following UE capabilities may be configured in the above-described embodiment (for example, the first aspect to the fifth aspect). Note that the following UE capabilities may each be interpreted as a parameter (for example, a higher layer parameter) configured for the UE by a network (for example, the base station).

UE capability information related to whether to support PDCCH repetition transmission (for example, PDCCH repetition) may be defined.

UE capability information related to whether to support PDCCH repetition for a certain type of common search space (for example, a CSS) may be defined. The certain type of common search space may be at least one of a Type0 CSS, a Type0A CSS, a Type1 CSS, a Type2 CSS, and a Type3 CSS, for example.

UE capability information related to whether to support PDCCH repetition for a certain DCI format may be defined. The certain DCI format may be at least one of DCI formats 2_0, 2_1, 2_4, and 2_5, for example.

UE capability information related to whether to support PDCCH repetition for search space set 0 may be defined.

UE capability information related to whether to support PDCCH repetition for a PDCCH order initiating/triggering PRACH transmission may be defined.

The above-described embodiment may be configured to be applied to a UE supporting/reporting at least one of the above-described UE capabilities. Alternatively, the above-described embodiment may be configured to be applied to a UE configured by a network.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 23:
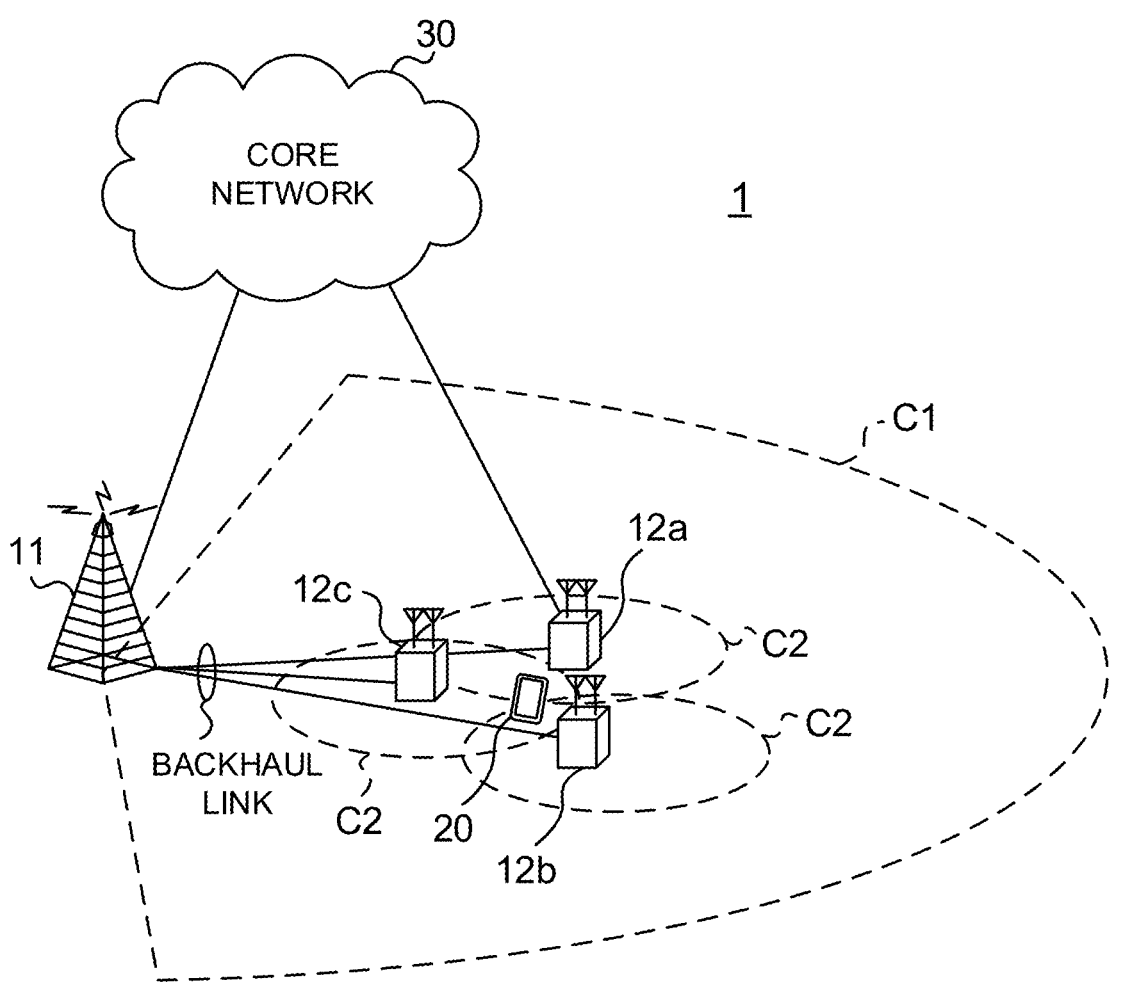
FIG. 23 is a diagram to show an example of a schematic structure of a radio communication system according to one embodiment.

FIG. 23 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 24:
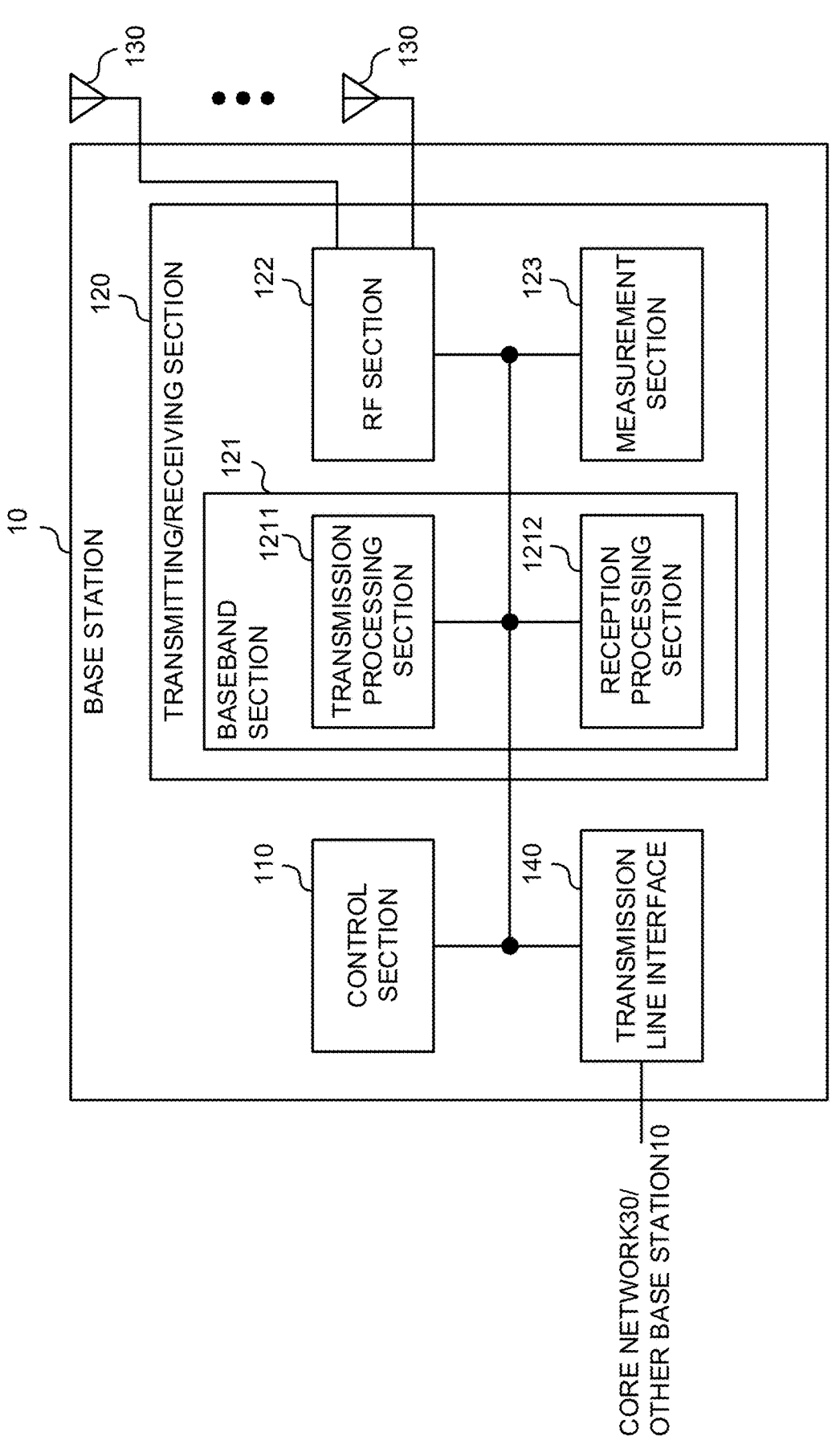
FIG. 24 is a diagram to show an example of a structure of a base station according to one embodiment.

FIG. 24 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit information related to a search space set for which a certain condition is commonly or separately configured for a plurality of downlink control channels applied with repetition transmission. The control section 110 may control transmission of the plurality of downlink control information, based on the information related to the search space set.

The transmitting/receiving section 120 may transmit first downlink control information indicating cancellation of UL transmission. The control section 110 may control whether uplink shared channel transmission is scheduled, based on a symbol position of a first downlink control channel providing the first downlink control information and a symbol position of second downlink control information providing second downlink control information for scheduling the uplink shared channel transmission. The control section 110 may judge the symbol position of the first downlink control channel and the symbol position of the second downlink control channel, based on at least one of whether repetition transmission of the first downlink control channel is performed and whether repetition transmission of the second downlink control channel is performed.

The transmitting/receiving section 120 may receive at least one of a random access channel and an uplink shared channel. The control section 110 may perform control to transmit downlink control information in a certain window duration in response to reception of at least one of a random access channel and an uplink shared channel. The control section 110 may determine the certain window duration, based on whether repetition transmission of a downlink control channel providing downlink control information is performed.

The transmitting/receiving section 120 may transmit first downlink control channel triggering transmission of a random access channel. When downlink control information is transmitted in response to the reception of the random access channel, the control section 110 may perform control that the first downlink control channel and the second downlink control channel providing downlink control information are in a quasi-co-location relationship (for example, DMRS antenna port quasi-co-location characteristics). The control section 110 may determine the first downlink control channel and the second downlink control channel being in a quasi-co-location relationship, based on at least one of whether repetition transmission of the first downlink control channel is performed and whether repetition transmission of the second downlink control channel is performed.

The transmitting/receiving section 120 may transmit information related to at least one of a search space set and a control resource set for repetition transmission of a downlink control channel. The control section 110 may control transmission of a downlink control channel applied with the repetition transmission, by using at least one of a plurality of associated search space sets and a plurality of associated control resource sets obtained based on the information.

(User Terminal)

Figure 25:
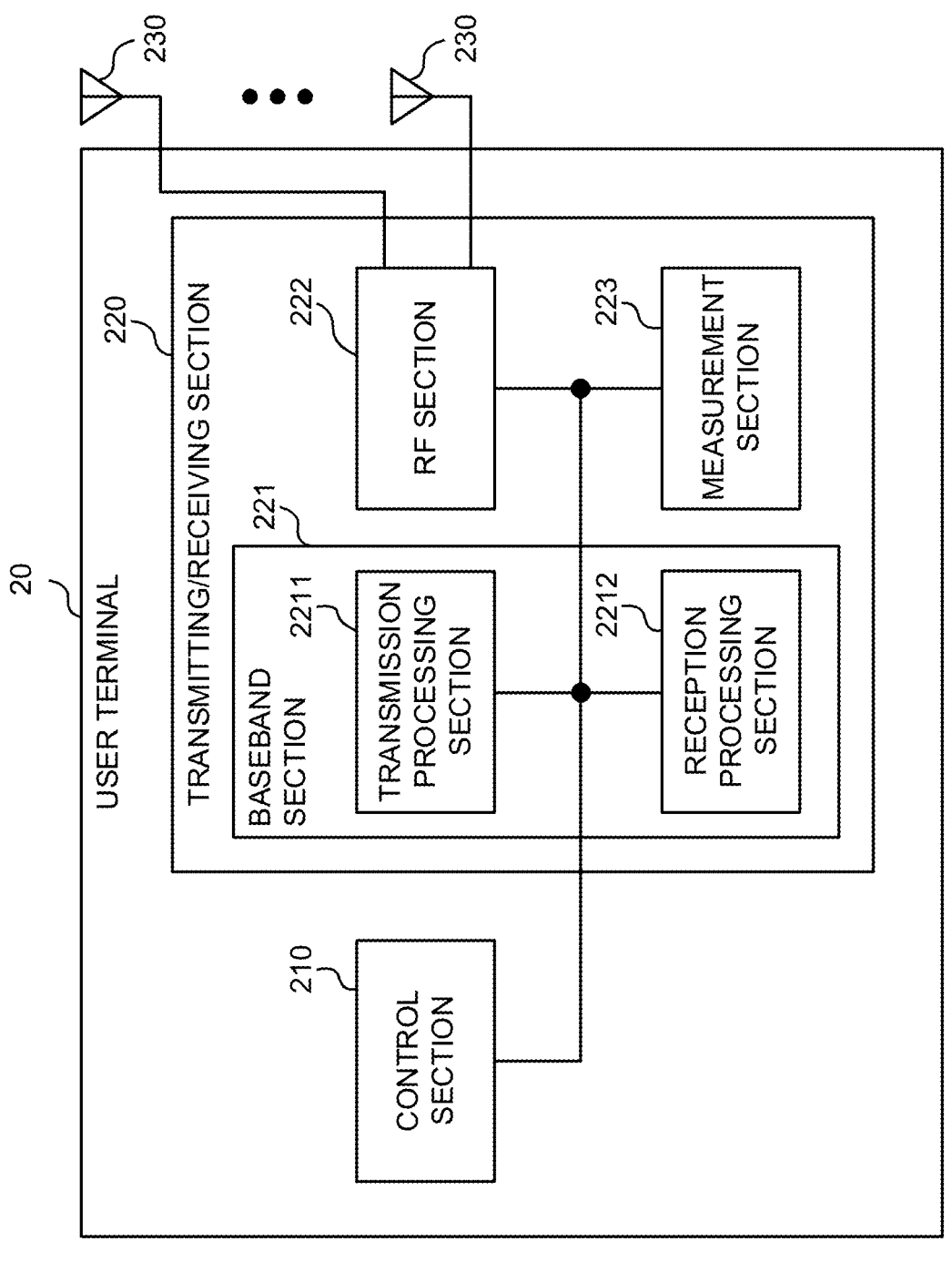
FIG. 25 is a diagram to show an example of a structure of a user terminal according to one embodiment.

FIG. 25 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive information related to a search space set for which a certain condition is commonly or separately configured for a plurality of downlink control channels applied with repetition transmission. The control section 210 may control reception of the plurality of downlink control information, based on the information related to the search space set. The certain condition may be at least one of an aggregation level and the number of downlink control channel candidates for each aggregation level. At least one of the aggregation level (for example, CCE AL) and the number of downlink control channel candidates for each aggregation level may be configured differently for the plurality of downlink control channels. When the number of downlink control channel candidates for each aggregation level is configured differently for the plurality of downlink control channels, at least part of the downlink control channel candidates configured for each downlink control channel may be associated.

The transmitting/receiving section 220 may receive first downlink control information indicating cancellation of UL transmission. The control section 210 may judge whether uplink shared channel transmission is scheduled, based on a symbol position of a first downlink control channel providing the first downlink control information and a symbol position of second downlink control information providing second downlink control information for scheduling the uplink shared channel transmission. The control section 210 may judge the symbol position of the first downlink control channel and the symbol position of the second downlink control channel, based on at least one of whether repetition transmission of the first downlink control channel is performed and whether repetition transmission of the second downlink control channel is performed.

When repetition transmission is applied to the second downlink control channel, the control section 210 may judge whether the uplink shared channel transmission is scheduled, based on a symbol position of a specific second downlink control channel selected from a plurality of second downlink control channels, based on a first reference. When repetition transmission is applied to the first downlink control channel, the control section 210 may judge whether the uplink shared channel transmission is scheduled, based on a symbol position of a specific first downlink control channel selected from a plurality of first downlink control channels, based on a second reference. It may be supported that the first reference and the second reference are applied/configured differently.

The transmitting/receiving section 220 may transmit at least one of a random access channel and an uplink shared channel. The control section 210 may perform control to detect downlink control information in a certain window duration in response to transmission of at least one of a random access channel and an uplink shared channel. The control section 210 may judge the certain window duration, based on whether repetition transmission of a downlink control channel providing downlink control information is performed.

When repetition transmission is applied to the downlink control channel providing the downlink control information, the control section 210 may judge the certain window duration by using, as a reference, a specific control resource set or a specific downlink control channel candidate among control resource sets or downlink control channel candidates corresponding to respective downlink control channels. The certain duration may start from a first symbol of the specific control resource set or the specific downlink control channel candidate after a last symbol of a random access channel occasion or an uplink shared channel occasion corresponding to the transmission of the random access channel. Control resource sets or downlink control channel candidates corresponding to the respective downlink control channels may be associated for configuration.

The transmitting/receiving section 220 may transmit a random access channel, based on a first downlink control channel. When downlink control information is detected in response to the transmission of the random access channel, the control section 210 may assume that the first downlink control channel and the second downlink control channel providing downlink control information are quasi-co-located. The control section 210 may judge the first downlink control channel and the second downlink control channel being in a quasi-co-location relationship, based on at least one of whether repetition transmission of the first downlink control channel is performed and whether repetition transmission of the second downlink control channel is performed.

When repetition transmission is applied to the first downlink control channel and the second downlink control channel, at least one of a plurality of the first downlink control channels applied with the repetition transmission and at least one of a plurality of the second downlink control channels applied with the repetition transmission may be in a quasi-co-location relationship. When repetition transmission is applied to the first downlink control channel and repetition transmission is not applied to the second downlink control channel, all or a specific first downlink control channel among a plurality of the first downlink control channels applied with the repetition transmission may be in a quasi-co-location relationship with the second downlink control channel. When repetition transmission is applied to the second downlink control channel and repetition transmission is not applied to the first downlink control channel, all or a specific second downlink control channel among a plurality of the second downlink control channels applied with the repetition transmission may be in a quasi-co-location relationship with the first downlink control channel.

The transmitting/receiving section 220 may receive information related to at least one of a search space set and a control resource set for repetition transmission of a downlink control channel. The control section 210 may control reception of a downlink control channel applied with the repetition transmission, based on at least one of a plurality of associated search space sets and a plurality of associated control resource sets obtained based on the information.

The control section 210 may judge at least one of the plurality of associated search space sets and the plurality of associated control resource sets, based on a value notified by higher layer signaling and a predefined association. The plurality of search space sets may be associated with the same control resource set. The control section 210 may determine one search space set and one control resource set, based on the information, and determines another search space set associated with the one search space set and another control resource set associated with the one control resource set, based on a certain condition/certain rule.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 26:
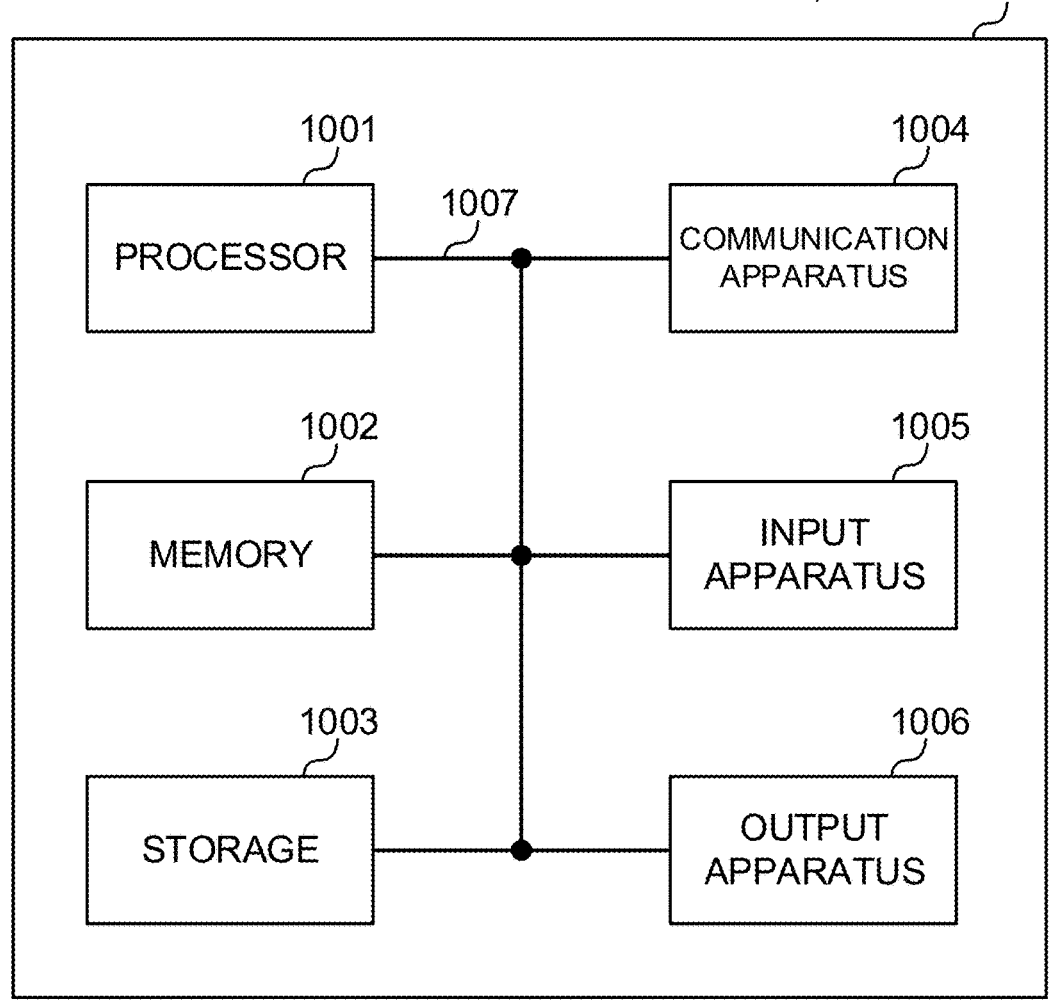
FIG. 26 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 26 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAN), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a "small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be a device mounted on a moving object or a moving object itself, and so on.

The moving object is a movable object with any moving speed, and a case where the moving object is stopped is also included. Examples of the moving object include a vehicle, a transport vehicle, an automobile, a motorcycle, a bicycle, a connected car, a loading shovel, a bulldozer, a wheel loader, a dump truck, a fork lift, a train, a bus, a trolley, a rickshaw, a ship and other watercraft, an airplane, a rocket, a satellite, a drone, a multicopter, a quadcopter, a balloon, and an object mounted on any of these, and these are not restrictive. The moving object may be a moving object that autonomously travels based on a direction for moving.

The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Figure 27:
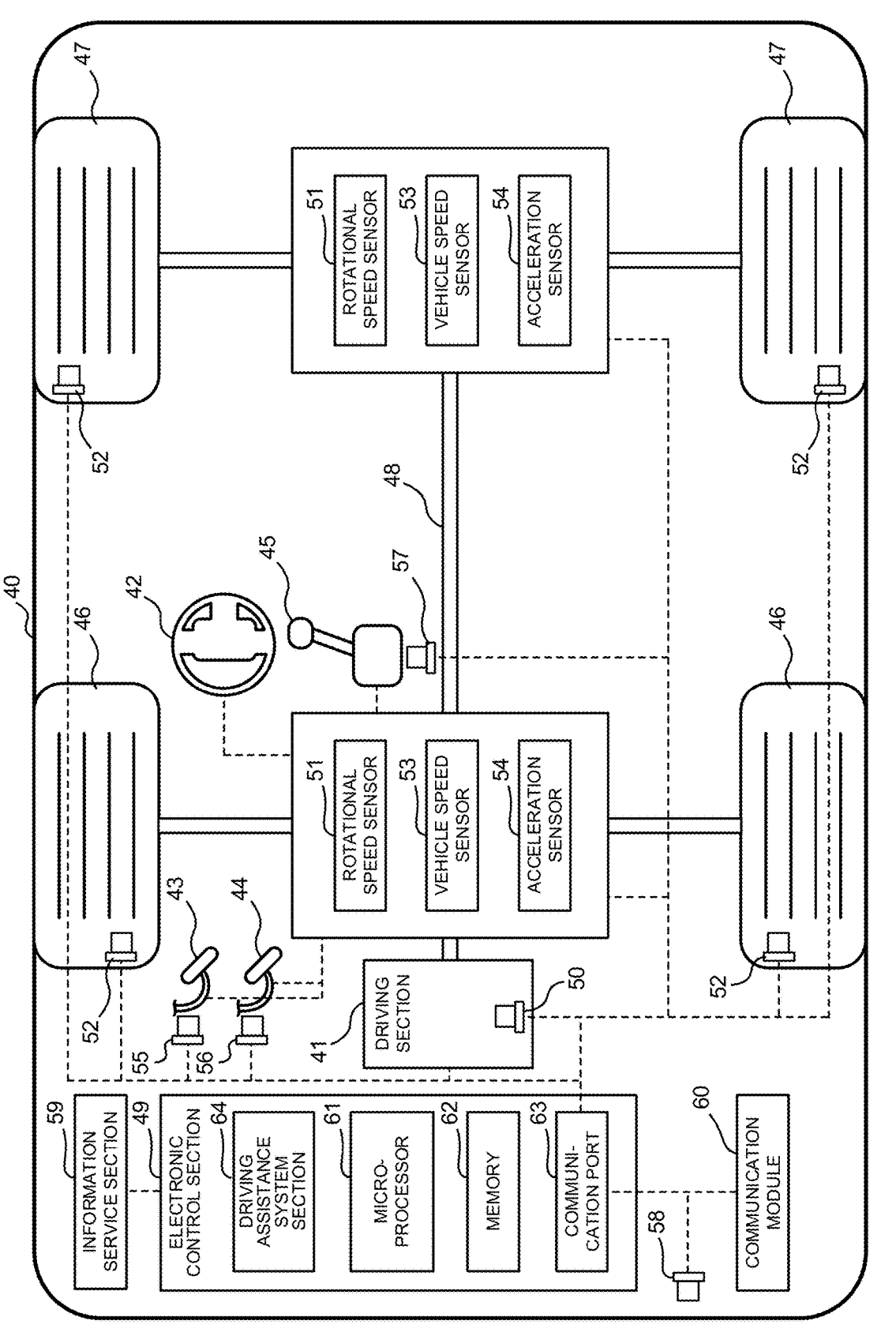
FIG. 27 is a diagram to show an example of a vehicle according to one embodiment.

FIG. 27 is a diagram to show an example of a vehicle according to one embodiment. As shown in FIG. 27, a vehicle 40 includes a driving section 41, a steering section 42, an accelerator pedal 43, a brake pedal 44, a shift lever 45, right and left front wheels 46, right and left rear wheels 47, an axle 48, an electronic control section 49, various sensors (including a current sensor 50, a rotational speed sensor 51, a pneumatic sensor 52, a vehicle speed sensor 53, an acceleration sensor 54, an accelerator pedal sensor 55, a brake pedal sensor 56, a shift lever sensor 57, and an object detection sensor 58), an information service section 59, and a communication module 60.

The driving section 41 includes, for example, at least one of an engine, a motor, and a hybrid of an engine and a motor. The steering section 42 at least includes a steering wheel, and is configured to steer at least one of the front wheels 46 and the rear wheels 47, based on operation of the steering wheel operated by a user.

The electronic control section 49 includes a microprocessor 61, a memory (ROM, RAM) 62, and a communication port (for example, an input/output (IO) port) 63. The electronic control section 49 receives, as input, signals from the various sensors 50 to 58 included in the vehicle. The electronic control section 49 may be referred to as an Electronic Control Unit (ECU).

Examples of the signals from the various sensors 50 to 58 include a current signal from the current sensor 50 for sensing current of a motor, a rotational speed signal of the front wheels 46/rear wheels 47 acquired by the rotational speed sensor 51, a pneumatic signal of the front wheels 46/rear wheels 47 acquired by the pneumatic sensor 52, a vehicle speed signal acquired by the vehicle speed sensor 53, an acceleration signal acquired by the acceleration sensor 54, a depressing amount signal of the accelerator pedal 43 acquired by the accelerator pedal sensor 55, a depressing amount signal of the brake pedal 44 acquired by the brake pedal sensor 56, an operation signal of the shift lever 45 acquired by the shift lever sensor 57, and a detection signal for detecting an obstruction, a vehicle, a pedestrian, and the like acquired by the object detection sensor 58.

The information service section 59 includes various devices for providing various information such as drive information, traffic information, and entertainment information, such as a car navigation system, an audio system, a speaker, a display, a television, and a radio, and one or more ECUs that control these devices. The information service section 59 provides various information/services (for example, multimedia information/multimedia service) for an occupant of the vehicle 40, using information acquired from an external apparatus via the communication module 60 and the like.

A driving assistance system section 64 includes various devices for providing functions for preventing an accident and reducing a driver's driving load, such as a millimeter wave radar, Light Detection and Ranging (LiDAR), a camera, a positioning locator (for example, a Global Navigation Satellite System (GNSS) and the like), map information (for example, a high definition (HD) map, an autonomous vehicle (AV)) map, and the like), a gyro system (for example, an inertial measurement apparatus (inertial measurement unit (IMU)), an inertial navigation apparatus (inertial navigation system (INS)), and the like), an artificial intelligence (AI) chip, and an AI processor, and one or more ECUs that control these devices. The driving assistance system section 64 transmits and receives various information via the communication module 60, and implements a driving assistance function or an autonomous driving function.

The communication module 60 can communicate with the microprocessor 61 and the constituent elements of the vehicle 40 via the communication port 63. For example, via the communication port 63, the communication module 60 transmits and receives data (information) to and from the driving section 41, the steering section 42, the accelerator pedal 43, the brake pedal 44, the shift lever 45, the right and left front wheels 46, the right and left rear wheels 47, the axle 48, the microprocessor 61 and the memory (ROM, RAM) 62 in the electronic control section 49, and the various sensors 50 to 58, which are included in the vehicle 40.

The communication module 60 can be controlled by the microprocessor 61 of the electronic control section 49, and is a communication device that can perform communication with an external apparatus. For example, the communication module 60 performs transmission and reception of various information to and from the external apparatus via radio communication. The communication module 60 may be either inside or outside the electronic control section 49. The external apparatus may be, for example, the base station 10, the user terminal 20, or the like described above. The communication module 60 may be, for example, at least one of the base station 10 and the user terminal 20 described above (may function as at least one of the base station 10 and the user terminal 20).

The communication module 60 may transmit at least one of a signal from the above-described various sensors 50 to 58 input to the electronic control section 49 and information obtained based on the signal, to the external apparatus via radio communication.

The communication module 60 receives various information (traffic information, signal information, inter-vehicle distance information, and the like) transmitted from the external apparatus, and displays the various information on the information service section 59 included in the vehicle. The communication module 60 stores the various information received from the external apparatus in the memory 62 that can be used by the microprocessor 61. Based on the information stored in the memory 62, the microprocessor 61 may perform control of the driving section 41, the steering section 42, the accelerator pedal 43, the brake pedal 44, the shift lever 45, the right and left front wheels 46, the right and left rear wheels 47, the axle 48, the various sensors 50 to 58, and the like included in the vehicle 40.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (U4B), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced, modified, created, or defined based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
a receiver that performs a reception of a first downlink control channel providing first downlink control information indicating cancellation of a first uplink (UL) transmission; and
a processor that, when the first UL transmission is cancelled based on an indication of the first downlink control information, determines scheduling of a second UL transmission on symbols including symbols for the first UL transmission, which is cancelled, based on a symbol position of the first downlink control channel reception and a symbol position of a second downlink control channel reception providing second downlink control information for scheduling the second UL transmission,
wherein the symbol position of the first downlink control channel reception and the symbol position of the second downlink control channel reception are determined based on whether at least one of the first downlink control channel reception and the second downlink control channel reception includes a plurality of downlink control channel candidates.

2. The terminal according to claim 1, wherein when the first downlink control channel reception includes a plurality of downlink control channel candidates, the symbol position of the first downlink control channel reception is a first symbol of a downlink control channel candidate that is earlier in a time domain among the plurality of downlink control channel candidates for the first downlink control channel reception.

3. The terminal according to claim 1, wherein when the second downlink control channel reception includes a plurality of downlink control channel candidates, the symbol position of the second downlink control channel reception is a last symbol of a downlink control channel candidate that is later in a time domain among the plurality of downlink control channel candidates for the second downlink control channel reception.

4. The terminal according to claim 2, wherein when the second downlink control channel reception includes a plurality of downlink control channel candidates, the symbol position of the second downlink control channel reception is a last symbol of a downlink control channel candidate that is later in a time domain among the plurality of downlink control channel candidates for the second downlink control channel reception.

5. The terminal according to claim 1, wherein the processor determines that the second UL transmission is not scheduled, when the first downlink control channel reception includes a plurality of downlink control channel candidates and when a last symbol of the second downlink control channel reception is arranged after a first symbol of a downlink control channel candidate that is earlier in a time domain among the plurality of downlink control channel candidates for the first downlink control channel reception.

6. The terminal according to claim 2, wherein the processor determines that the second UL transmission is not scheduled, when the first downlink control channel reception includes a plurality of downlink control channel candidates and when a last symbol of the second downlink control channel reception is arranged after a first symbol of a downlink control channel candidate that is earlier in a time domain among the plurality of downlink control channel candidates for the first downlink control channel reception.

7. The terminal according to claim 3, wherein the processor determines that the second UL transmission is not scheduled, when the first downlink control channel reception includes a plurality of downlink control channel candidates and when a last symbol of the second downlink control channel reception is arranged after a first symbol of a downlink control channel candidate that is earlier in a time domain among the plurality of downlink control channel candidates for the first downlink control channel reception.

8. A radio communication method for a terminal, comprising:
performing a reception of a first downlink control channel providing first downlink control information indicating cancellation of a first uplink (UL) transmission; and
when the first UL transmission is cancelled based on an indication of the first downlink control information, determining scheduling of a second UL transmission on symbols including symbols for the first UL transmission, which is cancelled, based on a symbol position of the first downlink control channel reception and a symbol position of a second downlink control channel reception providing second downlink control information for scheduling the second UL transmission, wherein the symbol position of the first downlink control channel reception and the symbol position of the second downlink control channel reception are determined based on whether at least one of the first downlink control channel reception and the second downlink control channel reception includes a plurality of downlink control channel candidates.

9. A base station comprising:

a transmitter that performs a transmission of a first downlink control channel providing first downlink control information indicating cancellation of a first uplink (UL) transmission; and a processor that, when the cancellation of the first UL transmission is indicated based on the first downlink control information, controls scheduling of a second UL transmission on symbols including symbols for the first UL transmission, which is indicated to be cancelled, based on a symbol position of the first downlink control channel transmission and a symbol position of a second downlink control channel transmission providing second downlink control information for scheduling the second UL transmission, wherein the symbol position of the first downlink control channel transmission and the symbol position of the second downlink control channel transmission are determined based on whether at least one of the first downlink control channel transmission and the second downlink control channel transmission includes a plurality of downlink control channel candidates.

10. A system comprising a terminal and a base station, wherein the terminal comprises:

a receiver that performs a reception of a first downlink control channel providing first downlink control information indicating cancellation of a first uplink (UL) transmission; and a processor that, when the first UL transmission is cancelled based on an indication of the first downlink control information, determines scheduling of a second UL transmission on symbols including symbols for the first UL transmission, which is cancelled, based on a symbol position of the first downlink control channel reception and a symbol position of a second downlink control channel reception providing second downlink control information for scheduling the second UL transmission, wherein the symbol position of the first downlink control channel reception and the symbol position of the second downlink control channel reception are determined based on whether at least one of the first downlink control channel reception and the second downlink control channel reception includes a plurality of downlink control channel candidates, and the base station comprises:

a transmitter that transmits the first downlink control channel; and a processor that, when the cancellation of the first UL transmission is indicated based on the first downlink control information, controls the scheduling of the second UL transmission on the symbols including the symbols for the first UL transmission, which is indicated to be cancelled, based on the symbol position of the first downlink control channel reception and the symbol position of the second downlink control channel reception providing the second downlink control information for scheduling the second UL transmission.

* * * * *